US00RE47998E

(19) United States
(12) Reissued Patent
Arakane

(10) Patent Number: US RE47,998 E
(45) Date of Reissued Patent: May 19, 2020

(54) INKJET PRINTER AND METHOD FOR ACQUIRING GAP INFORMATION OF THE INKJET PRINTER

(71) Applicant: BROTHER KOGYO KABUSHIKI KAISHA, Nagoya, Aichi (JP)

(72) Inventor: Satoru Arakane, Aichi (JP)

(73) Assignee: BROTHER KOGYO KABUSHIKI KAISHA, Aichi (JP)

(21) Appl. No.: 15/471,850

(22) Filed: Mar. 28, 2017

Related U.S. Patent Documents

Reissue of:
(64) Patent No.: 9,120,341
Issued: Sep. 1, 2015
Appl. No.: 13/729,192
Filed: Dec. 28, 2012

(30) Foreign Application Priority Data

Mar. 30, 2012 (JP) ..... 2012-082617

(51) Int. Cl.
*B41J 25/00* (2006.01)
*B41J 11/00* (2006.01)

(52) U.S. Cl.
CPC ..... *B41J 25/001* (2013.01); *B41J 11/001* (2013.01); *B41J 11/005* (2013.01)

(58) Field of Classification Search
CPC ..... B41J 25/001; B41J 11/005; B41J 11/001
See application file for complete search history.

(56) References Cited

U.S. PATENT DOCUMENTS 5,366,301 A 11/1994 Martin et al.
5,515,094 A 5/1996 Tanaka et al.
5,659,404 A 8/1997 Matsuda
5,847,719 A 12/1998 Yamaguchi et al.
6,092,939 A 7/2000 Nishikori et al.
6,310,637 B1 10/2001 Shimada et al.
6,336,703 B1 * 1/2002 Otsuki ..... 347/41
(Continued)

FOREIGN PATENT DOCUMENTS

CN 1990242 A 7/2007
CN 101058244 A 10/2007
(Continued)

OTHER PUBLICATIONS

Extended European Search Report dated Jul. 9, 2013 from related EP 12199740.7 from parent U.S. Appl. No. 13/729,753.
(Continued)

*Primary Examiner* — Minh Nguyen
(74) *Attorney, Agent, or Firm* — Scully Scott Murphy and Presser

(57) ABSTRACT

An inkjet printer, including an inkjet head, a conveyer unit to convey a recording medium in a conveying direction, a position detecting unit to detect a position of the recording medium along the conveying direction, a wave shape generating mechanism to deform the recording medium into a predetermined wave shape along a direction orthogonal to the conveying direction, a gap information storing device to store gap information related to a gap between an ink discharging surface of the inkjet head and the recording medium, and a correcting device to correct the gap information according to a position of the recording medium along the conveying direction, is provided.

20 Claims, 13 Drawing Sheets

(56) References Cited

U.S. PATENT DOCUMENTS

| | | | | |
|---|---|---|---|---|
| 6,604,803 | B1 | 8/2003 | Hanabusa et al. | |
| 6,827,418 | B2 | 12/2004 | Otokita | |
| 6,900,449 | B2 | 5/2005 | Bolash et al. | |
| 6,964,476 | B2 | 11/2005 | Okamoto | |
| 7,083,245 | B2 | 8/2006 | Yamamoto | |
| 7,267,419 | B2 * | 9/2007 | Yamasaki | B41J 29/393 347/104 |
| 7,309,179 | B2 | 12/2007 | Toran et al. | |
| 7,530,659 | B2 | 5/2009 | Doherty et al. | |
| 7,533,954 | B2 | 5/2009 | Nakazawa et al. | |
| 8,118,382 | B2 | 2/2012 | Hampel et al. | |
| 8,118,422 | B2 | 2/2012 | Hibbard et al. | |
| 8,282,194 | B2 | 10/2012 | Ozawa | |
| 8,556,382 | B2 | 10/2013 | Kang | |
| 8,714,693 | B2 | 5/2014 | Arakane | |
| 8,740,328 | B2 | 6/2014 | Terada | |
| 8,882,215 | B2 | 11/2014 | Arakane | |
| 8,888,227 | B2 | 11/2014 | Arakane | |
| 9,156,295 | B2 | 10/2015 | Arakane | |
| 9,162,441 | B1 | 10/2015 | Noda | |
| 9,162,502 | B2 | 10/2015 | Terada | |
| 9,315,056 | B2 | 4/2016 | Arakane | |
| 9,481,189 | B2 | 11/2016 | Arakane | |
| 9,834,018 | B2 | 12/2017 | Terada | |
| 9,873,272 | B2 | 1/2018 | Arakane | |
| 10,272,706 | B2 | 4/2019 | Arakane | |
| 2002/0196298 | A1 | 12/2002 | Cheng et al. | |
| 2003/0001939 | A1 | 1/2003 | Scofield et al. | |
| 2003/0048345 | A1 | 3/2003 | Matsumoto | |
| 2004/0126164 | A1 | 7/2004 | Ohyama | B41J 11/005 400/58 |
| 2004/0223017 | A1 * | 11/2004 | Otsuki | 347/14 |
| 2005/0052487 | A1 | 3/2005 | Yamasaki | |
| 2005/0168557 | A1 * | 8/2005 | Ohyama | 347/104 |
| 2007/0040878 | A1 | 2/2007 | Ikefuji et al. | |
| 2007/0229562 | A1 | 10/2007 | Doherty et al. | |
| 2007/0291077 | A1 | 12/2007 | Seki et al. | |
| 2008/0150978 | A1 | 6/2008 | Sato et al. | |
| 2009/0085949 | A1 | 4/2009 | Sugiyama et al. | |
| 2009/0122098 | A1 | 5/2009 | Shindo | |
| 2009/0251521 | A1 | 10/2009 | Arai | |
| 2009/0262157 | A1 | 10/2009 | Sato et al. | |
| 2011/0175958 | A1 | 7/2011 | Sato et al. | |
| 2011/0249049 | A1 | 10/2011 | Taira et al. | |
| 2012/0063800 | A1 | 3/2012 | Rossell et al. | |

FOREIGN PATENT DOCUMENTS

| | | | | |
|---|---|---|---|---|
| EP | 0622227 | A2 | 4/1994 | |
| EP | 0 622 227 | A2 | 11/1994 | |
| EP | 0 622 227 | A3 | 12/2001 | |
| EP | 1 160 088 | A2 | 12/2001 | |
| EP | 1 182 041 | A1 | 2/2002 | |
| EP | 1 449 663 | A1 | 8/2004 | |
| JP | H08-307688 | A | 11/1996 | |
| JP | H10-138463 | A | 5/1998 | |
| JP | 11-138923 | A | 5/1999 | |
| JP | H11-151242 | A | 6/1999 | |
| JP | 2000-071532 | A | 3/2000 | |
| JP | 2001-096733 | A | 4/2001 | |
| JP | 2002-160357 | A | 6/2002 | |
| JP | 2003-54078 | A | 2/2003 | |
| JP | 2003-054078 | A | 2/2003 | |
| JP | 2004-017586 | A | 1/2004 | |
| JP | 2004-17586 | A | 1/2004 | |
| JP | 2004-106978 | A | 4/2004 | |
| JP | 2004-406978 | A | 4/2004 | |
| JP | 3554184 | B2 | 8/2004 | |
| JP | 2004-314361 | A | 11/2004 | |
| JP | 2004314361 | A * | 11/2004 | B41J 2/01 |
| JP | 2006-192636 | A | 7/2006 | |
| JP | 2006-192814 | A | 7/2006 | |
| JP | 2007-025492 | A | 2/2007 | |
| JP | 2007-25492 | A | 2/2007 | |
| JP | 2007-144666 | A | 6/2007 | |
| JP | 2007-144718 | A | 6/2007 | |
| JP | 2008-155423 | A | 7/2008 | |
| JP | 2008-155424 | A | 7/2008 | |
| JP | 2008-455423 | A | 7/2008 | |
| JP | 2008-455424 | A | 7/2008 | |
| JP | 2009-143152 | A | 7/2008 | |
| JP | 2008-230069 | A | 10/2008 | |
| JP | 2009-023121 | A | 2/2009 | |
| JP | 2009-23121 | A | 2/2009 | |
| JP | 2009-143152 | A | 7/2009 | |
| JP | 2009-178986 | A | 8/2009 | |
| JP | 2009-202430 | A | 9/2009 | |
| JP | 2009-255386 | A | 11/2009 | |
| JP | 2011-218625 | A | 11/2011 | |

OTHER PUBLICATIONS

Notification of First Office Action dated Sep. 4, 2014 received from the Chinese Patent Office from related Chinese Patent Application No. 201210586540.3, together with an English language translation.

Notice of Reasons for Rejection dated Jul. 15, 2014 from related Japanese Application No. 2012-082621, together with an English language translation.

Japanese Official Action dated Feb. 17, 2015 received in related application JP 2012-082621 together with an English language translation.

Japanese Notification of Reasons for Rejection dated Jul. 26, 2016 received in related application JP 2015-173555 together with an English language translation.

Japanese Official Action dated Feb. 2, 2016 received in related application JP 2012-286356 together with an English language translation.

Japanese Official Action dated Feb. 2, 2016 received in related application JP 2012-286357 together with an English language translation.

Japanese Official Action dated Feb. 2, 2016 received in related application JP 2012-286358 together with an English language translation.

Notification of Reasons for Rejection dated Jan. 27, 2017 received in related application JP 2015-173555 together with an English language translation.

Extended European Search Report dated Jul. 10, 2013 from related EP 12199749.8.

Extended European Search Report dated Jul. 11, 2013 from related EP 12199734.0 from related U.S. Appl. No. 13/729,697.

Extended European Search Report dated Jul. 9, 2013 from related EP 12199737.3.

Notification of Reasons for Rejection dated Sep. 20, 2016 issued in Japanese Application No. 2012-286358 together with an English language translation.

European Official Action dated Dec. 21, 2015 received in related application EP 12 199 743.1.

List of Patents or Patent Applications Treated as Related dated Jun. 29, 2017, 3 pages.

Notice of Allowance dated Sep. 4, 2018 from related application U.S. Appl. No. 15/796,935.

Office Action dated Aug. 26, 2019 received in U.S. Appl. No. 16/272,382.

Office Action dated Sep. 16, 2019 received in U.S. Appl. No. 16/397,598.

Office Action dated Sep. 13, 2019 received in U.S. Appl. No. 16/158,955.

United States Official Action dated Mar. 30, 2018 received in related U.S. Appl. No. 15/243,358.

Notice of Allowance dated May 25, 2018 received in related U.S. Appl. No. 15/830,424.

Notice of Allowance dated Apr. 24, 2015 issued in U.S. Appl. No. 13/729,192.

Office Action dated Oct. 28, 2014 issued in U.S. Appl. No. 13/729,192.

Official Action dated Jul. 27, 2018 received from the United States Patent Office in related U.S. Appl. No. 15/876,722.

(56) References Cited

OTHER PUBLICATIONS

Official Action dated Mar. 6, 2020 received in related U.S. Appl. No. 16/251,681.
Extended European Search Report dated Jul. 9, 2013 from related EP 12199743.1.

* cited by examiner

INKJET PRINTER AND METHOD FOR ACQUIRING GAP INFORMATION OF THE INKJET PRINTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application *is a reissue application of U.S. Pat. No. 9,120,341 B2, which issued on Sep. 1, 2015, having U.S. Ser. No. 13/729,192, which* claims priority from Japanese Patent Application No. 2012-082617, filed on Mar. 30, 2012, the entire subject matter of which is incorporated herein by reference.

BACKGROUND

1. Technical Field

The following description relates to one or more techniques for an inkjet printer capable of printing an image on a recording medium by discharging ink from nozzles and a method for acquiring gap information, which is related to a gap between an ink discharging surface of the inkjet printer and the recording medium.

2. Related Art

As an example of inkjet printers configured to perform printing by discharging ink from nozzles onto a recording medium, an inkjet printer has been known that is configured to perform printing by discharging ink onto a recording sheet (a recording medium) from a recording head (an inkjet head) mounted on a carriage reciprocating along a predetermined head-moving direction. Further, the known inkjet printer is configured to cause a feed rollers or corrugated holding spur wheels to press the recording sheet against a surface of a platen that has thereon convex portions and concave portions alternately formed along the head-moving direction, so as to deform the recording sheet in a predetermined wave shape. The predetermined wave shape has mountain portions, which protrude toward an ink discharging surface of the recording head, and valley portions, which are recessed in a direction opposite to the direction toward the ink discharging surface side, alternately arranged along the head-moving direction.

SUMMARY

In the known inkjet printer, levels (amounts) of the gap between the ink discharging surface of the recording head and the recording sheet vary depending on portions (locations) on the recording sheet deformed in the wave shape (hereinafter, which may be referred to as a "wave-shaped recording sheet"). Therefore, when the known inkjet printer performs printing by discharging ink from the recording head onto the wave-shaped recording sheet with the same ink discharging timing as when performing printing on a recording sheet not deformed in such a wave shape, an ink droplet might land in a position deviated from a desired position on the recording sheet. Thus, the positional deviation value with respect to the ink landing position on the recording sheet varies depending on the portions (locations) on the recording sheet.

In view of the above problem, for instance, the following method is considered as a measure for discharging an ink droplet in a desired position on the wave-shaped recording sheet. The method is to adjust ink discharging timing (a moment) to discharge an ink droplet from the inkjet head depending on an amount of the gap between the ink discharging surface of the inkjet head and each individual one of (tops of) the mountain portions and (bottoms of) the valley portions formed on the recording sheet. Further, in order to adjust the ink discharging timing, it is required to detect amounts of the gap between the ink discharging surface of the inkjet head and each individual one of (the tops of) the mountain portions and (the bottoms of) the valley portions on the recording sheet.

Aspects of the present invention are advantageous in that an inkjet printer, by which information concerning a gap between an ink discharging surface of an inkjet head and each individual one of tops of mountain portions and bottoms of valley portions on a recording sheet deformed in a wave shape can be acquired, and a method to acquire the information are provided.

According to aspects of the present invention, an inkjet printer, including an inkjet head configured to discharge ink droplets from nozzles formed in an ink discharging surface thereof; a head scanning unit configured to move the inkjet head with respect to a recording medium to reciprocate along a head-moving direction, the head-moving direction being parallel with the ink discharging surface of the inkjet head; a conveyer unit configured to convey the recording medium in a conveying direction which intersects the head-moving direction, the conveyer unit including a feed roller and an ejection roller, which are arranged to have the inkjet head interposed therebetween along the conveying direction; a position detecting unit configured to detect a position of the recording medium along the conveying direction; a wave shape generating mechanism configured to deform the recording medium into a predetermined wave shape that has tops of portions protruding toward the ink discharging surface and bottoms of portions recessed toward a side opposite from the ink discharging surface, the tops and the bottoms being alternately arranged along the head-moving direction; a gap information storing device configured to store gap information related to a gap between the ink discharging surface and the recording medium located in a predetermined reference position along the conveying direction, the gap information being acquired from a predetermined range in the recording medium; and a correcting device configured to correct the gap information stored in the gap information storing device according to a position of the recording medium along the conveying direction detected by the position detecting unit, is provided.

According to aspects of the present invention, a method configured to be implemented on a control device connected with an inkjet printer is provided. The inkjet printer includes an inkjet head configured to discharge ink droplets from nozzles formed in an ink discharging surface thereof; a conveyer unit configured to convey a recording medium in a conveying direction, the conveyer unit including a feed roller and an ejection roller, which are arranged to have the inkjet head interposed therebetween along the conveying direction; a position detecting unit configured to detect a position of the recording medium along the conveying direction; a wave shape generating mechanism configured to deform the recording medium into a predetermined wave shape that has tops of portions protruding toward the ink discharging surface and bottoms of portions recessed toward a side opposite from the ink discharging surface, the tops and the bottoms being alternately arranged along an orthogonal direction being orthogonal to the conveying direction; and a control device. The control device is configured to store gap information related to a gap between the ink discharging surface and the recording medium located in a predetermined reference position along the conveying direction, the gap information being acquired from a predetermined range in the recording medium; and correct the stored gap information according to a position of the recording medium along the conveying direction detected by the position detecting unit.

According to aspects of the present invention, an inkjet printer including an inkjet head configured to discharge ink droplets from nozzles formed in an ink discharging surface thereof; a head scanning unit configured to move the inkjet head with respect to a recording medium to reciprocate along a head-moving direction, the head-moving direction being parallel with the ink discharging surface of the inkjet head; a conveyer unit configured to convey the recording medium in a conveying direction which intersects the head-moving direction, the conveyer unit including a feed roller and an ejection roller, which are arranged to have the inkjet head interposed therebetween along the conveying direction; a position detecting unit configured to detect a position of the recording medium along the conveying direction; a wave shape generating mechanism configured to deform the recording medium into a predetermined wave shape that has tops of portions protruding toward the ink discharging surface and bottoms of portions recessed toward a side opposite from the ink discharging surface, the tops and the bottoms being alternately arranged along the head-moving direction; and a control device is provided. The control device is configured to store gap information related to a gap between the ink discharging surface and the recording medium located in a predetermined reference position along the conveying direction, the gap information being acquired from a predetermined range in the recording medium; and correct the stored gap information according to a position of the recording medium along the conveying direction detected by the position detecting unit.

BRIEF DESCRIPTION OF THE ACCOMPANYING DRAWINGS

Figure 1:
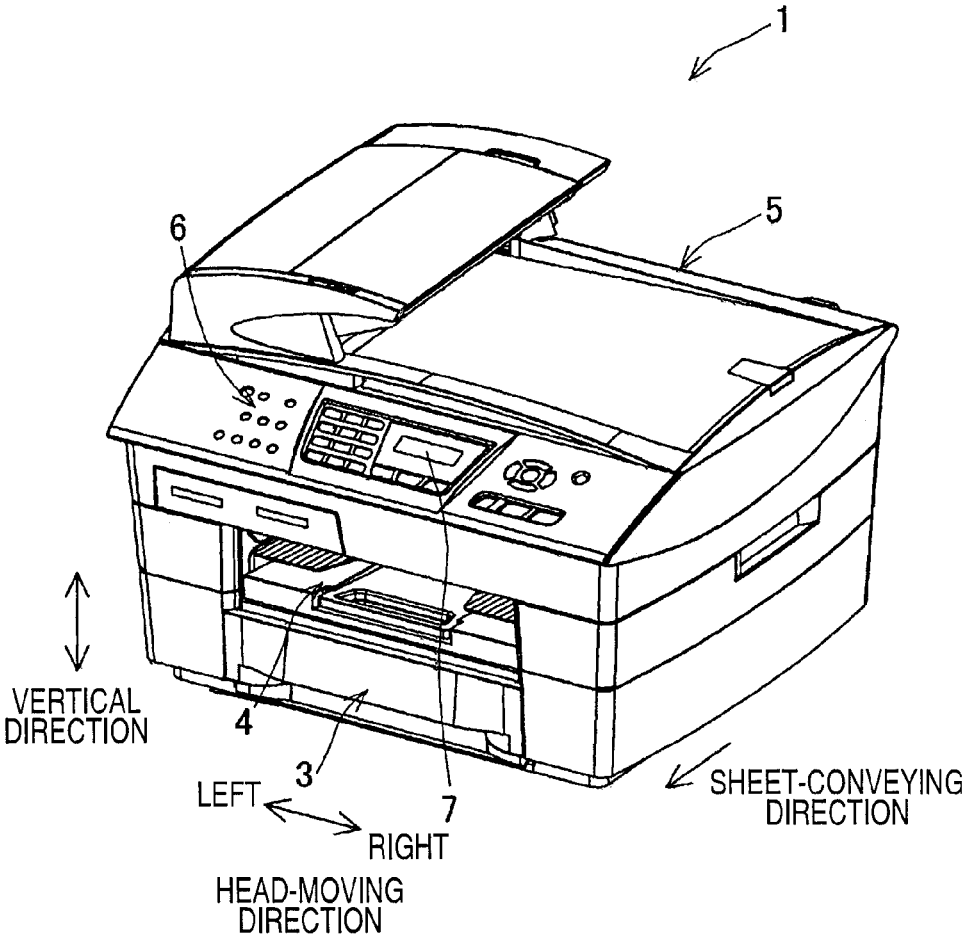
FIG. 1 is a perspective view schematically showing a configuration of an inkjet printer in an embodiment according to one or more aspects of the present invention.
Figure 2:
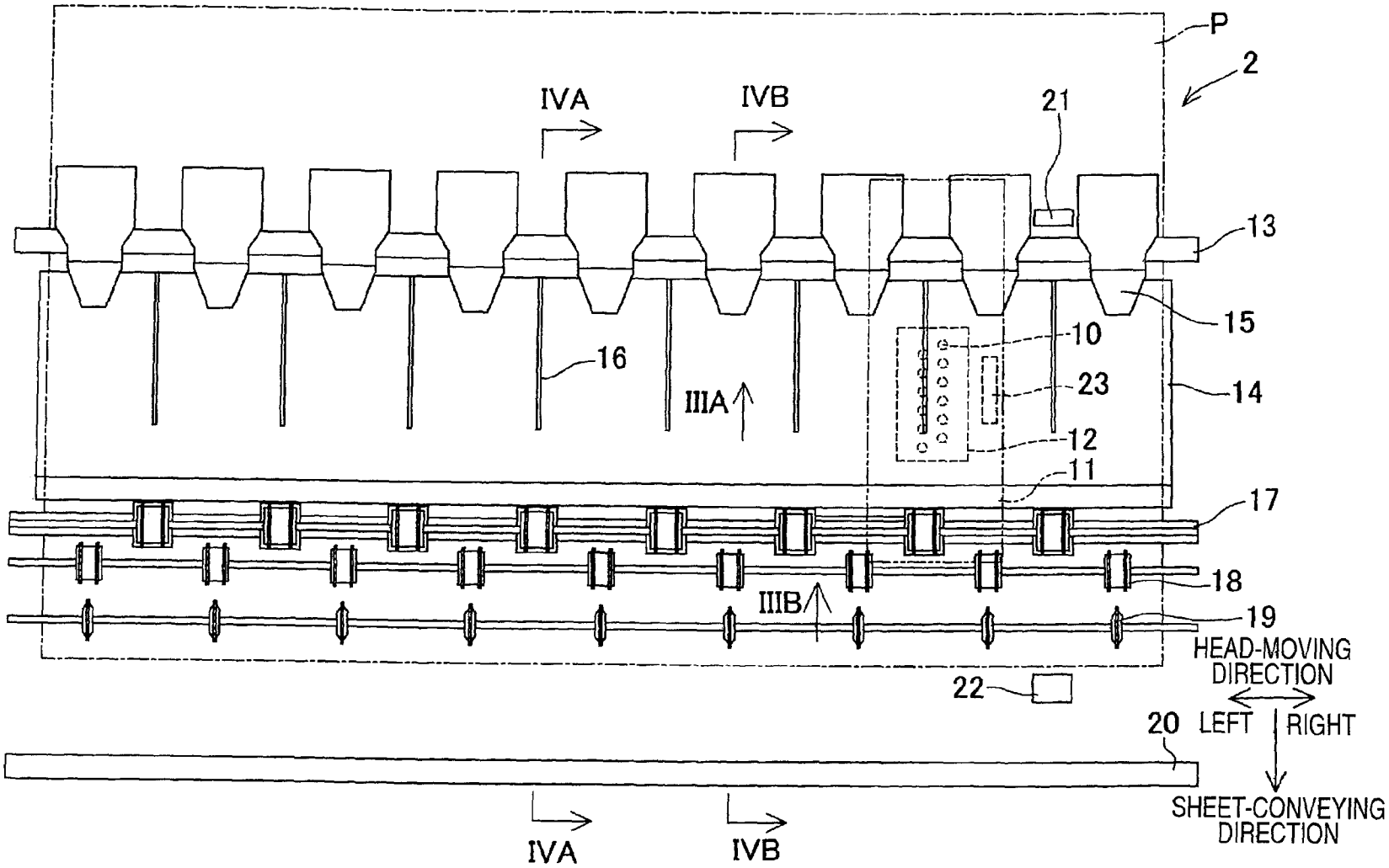
FIG. 2 is a top view of a printing unit of the inkjet printer in the embodiment according to one or more aspects of the present invention.
Figure 3A:
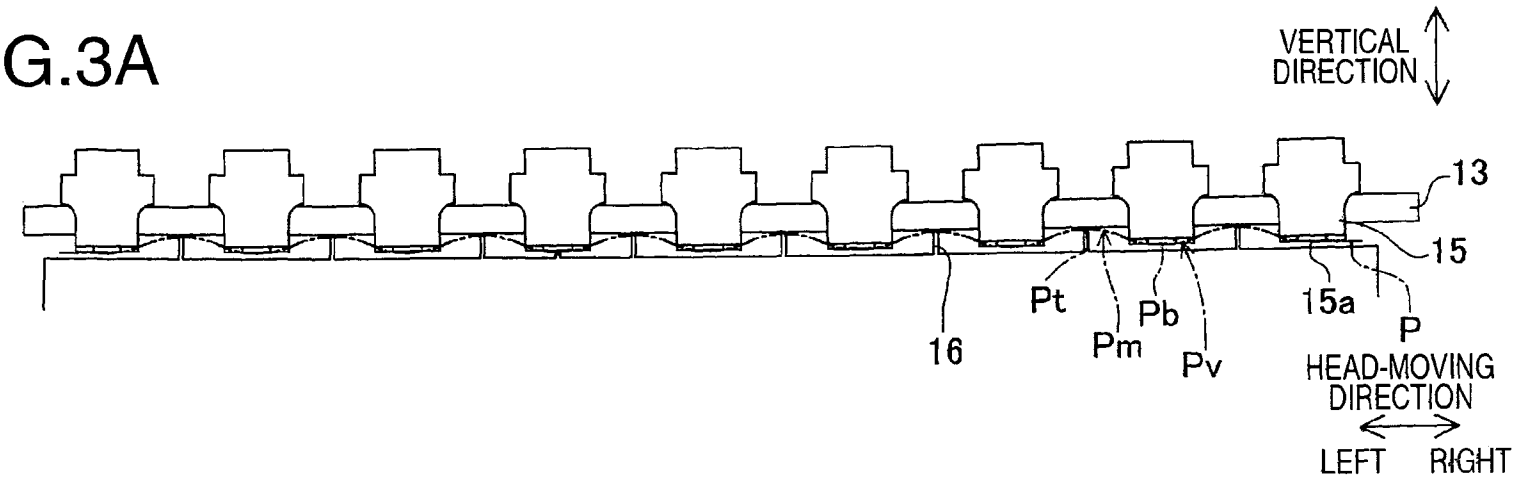

FIG. 3A schematically shows a part of the printing unit when viewed along an arrow IIIA shown in FIG. 2 in the embodiment according to one or more aspects of the present invention.

Figure 3B:
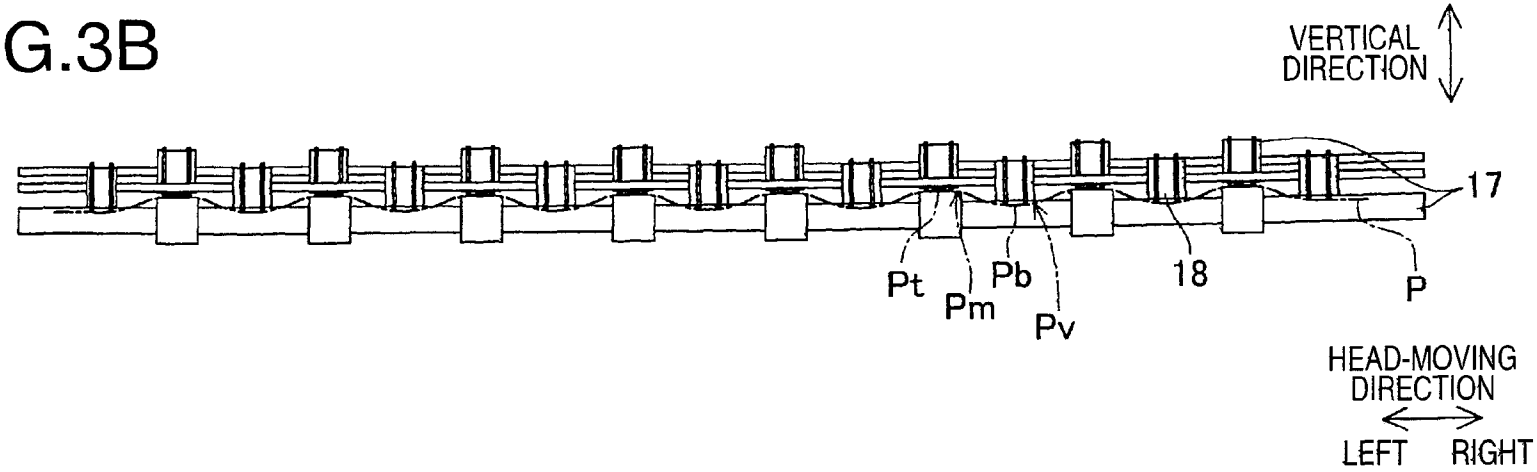

FIG. 3B schematically shows a part of the printing unit when viewed along an arrow IIIB shown in FIG. 2 in the embodiment according to one or more aspects of the present invention.

Figure 4A:
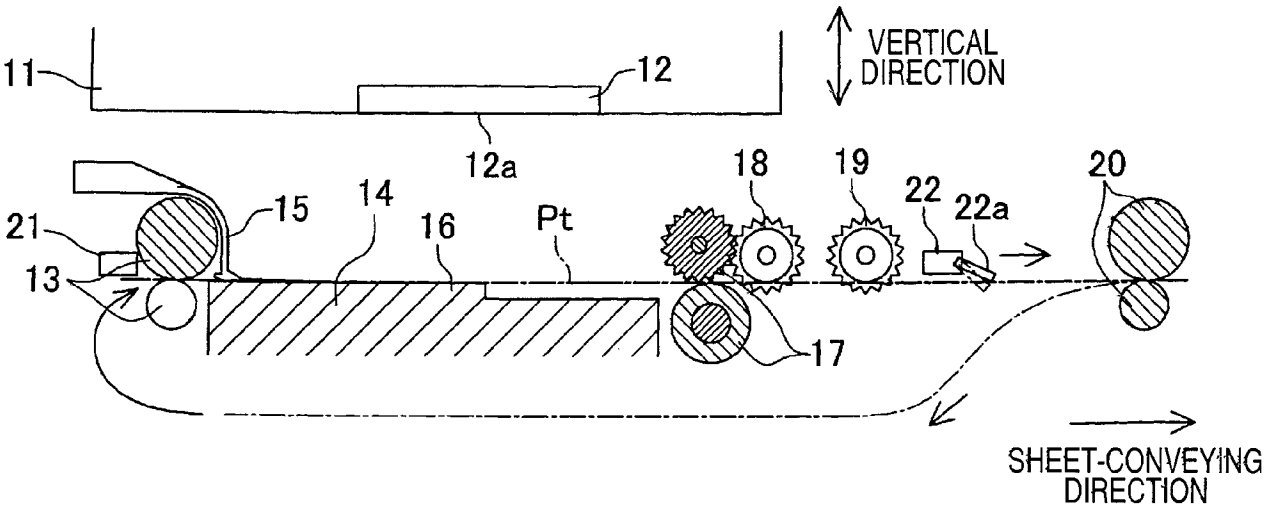

FIG. 4A is a cross-sectional view taken along a line IVA-IVA shown in FIG. 2 in the embodiment according to one or more aspects of the present invention.

Figure 4B:
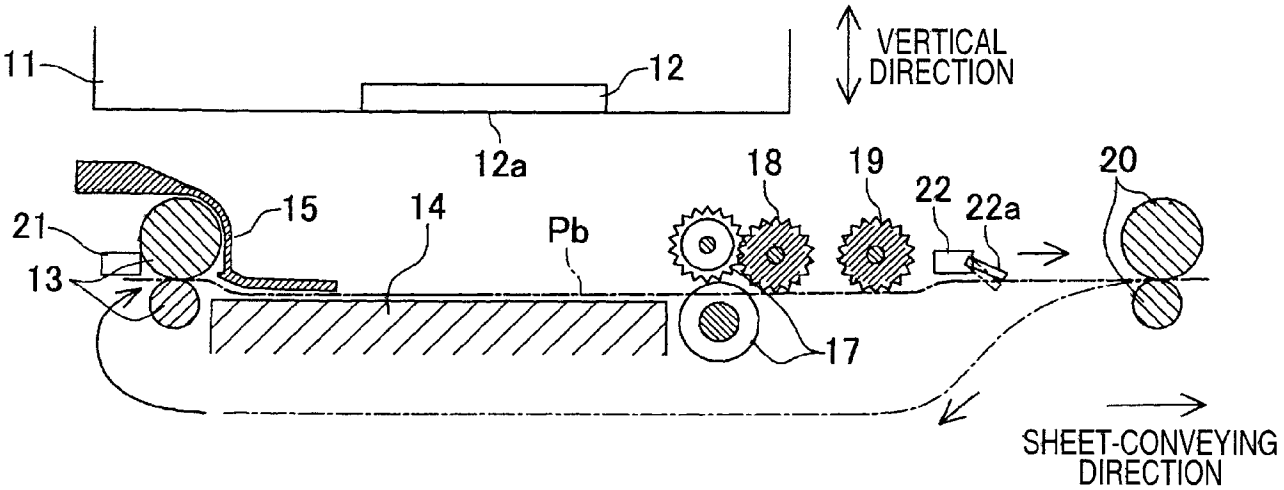

FIG. 4B is a cross-sectional view taken along a line IVB-IVB shown in FIG. 2 in the embodiment according to one or more aspects of the present invention.

Figure 5:
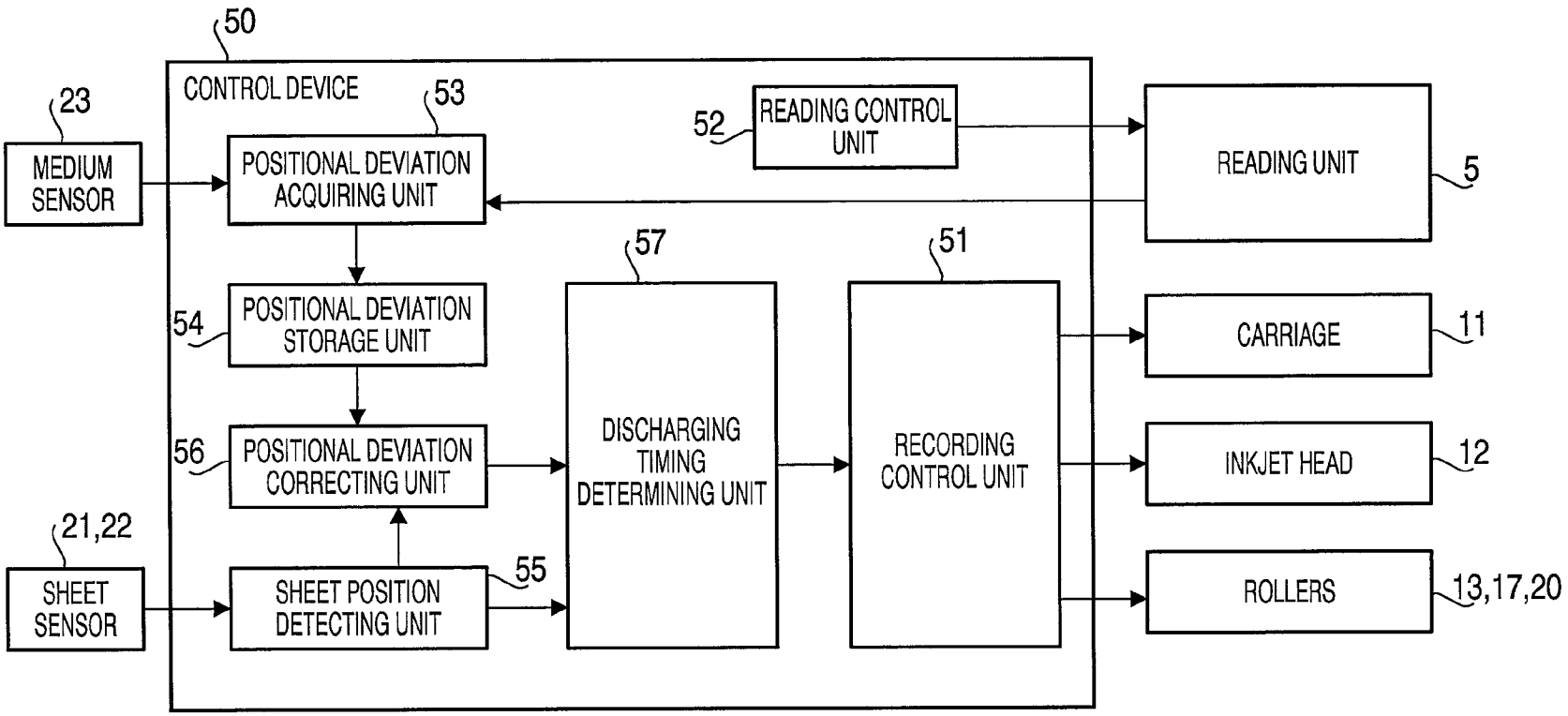

FIG. 5 is a functional block diagram of a control device of the inkjet printer in the embodiment according to one or more aspects of the present invention.

Figure 6A:
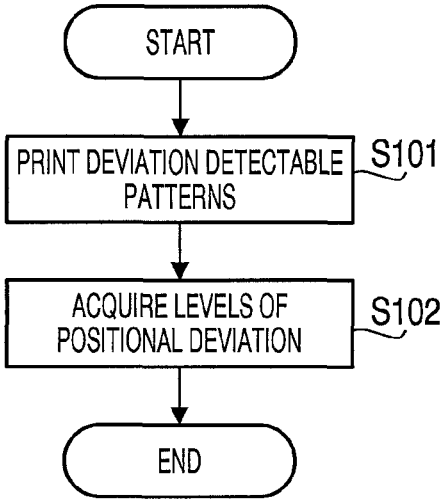

FIG. 6A is a flowchart to illustrate a process, which is to be executed prior to a printing operation, to determine ink discharging timing to discharge ink from nozzles in the inkjet printer in the embodiment according to one or more aspects of the present invention.

Figure 6B:
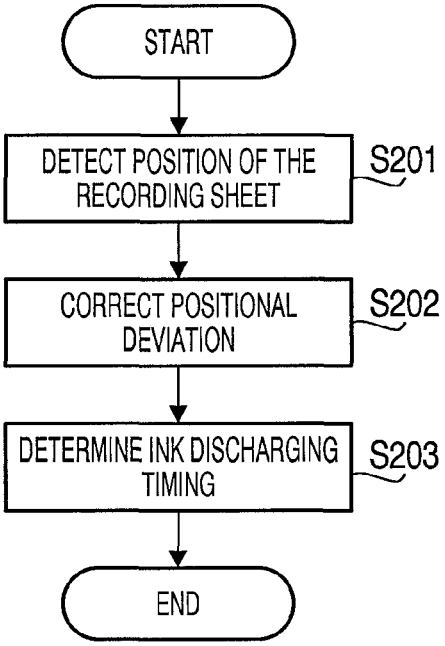

FIG. 6B is a flowchart to illustrate a process, which is to be executed during a printing operation, to determine ink discharging timing to discharge ink from nozzles in the inkjet printer in the embodiment according to one or more aspects of the present invention.

Figure 7A:
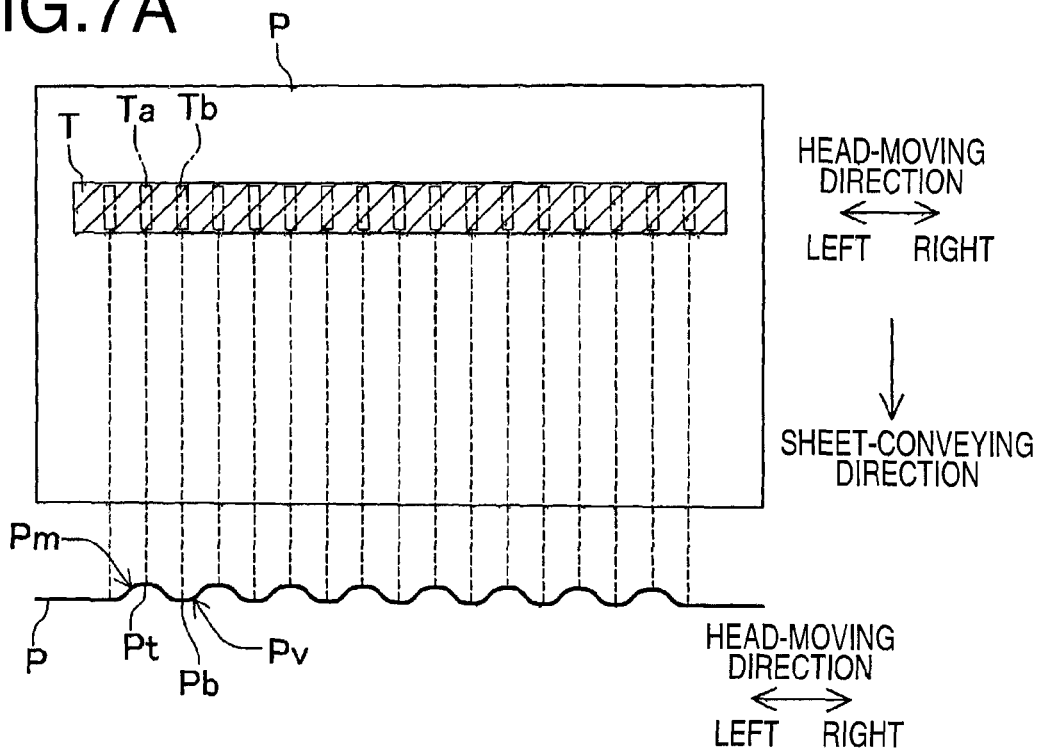

FIG. 7A shows deviation detectable patterns printed on a recording sheet and positions to read the deviation detectable patterns in the embodiment according to one or more aspects of the present invention.

Figure 7B:
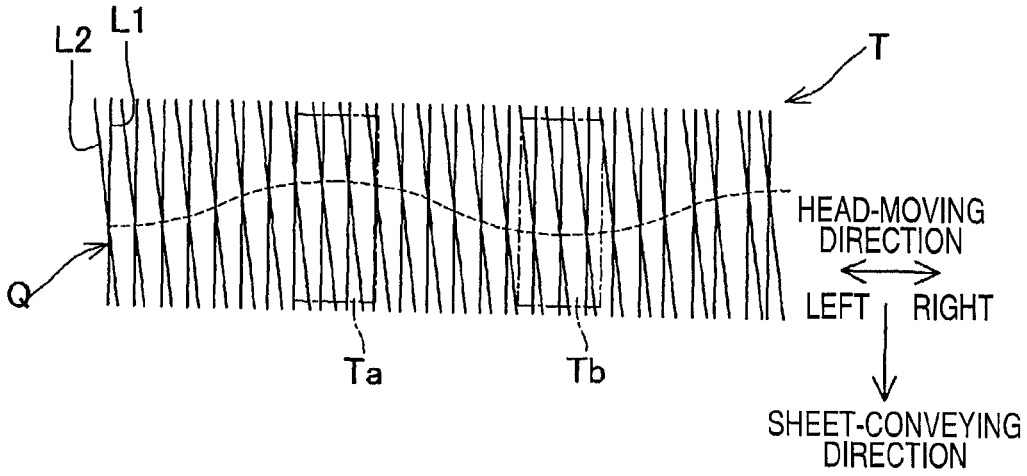

FIG. 7B is an enlarged view partially showing a part including a plurality of deviation detectable patterns printed on the recording sheet in the embodiment according to one or more aspects of the present invention.

FIGS. 8A-8F illustrate transition of positions of the recording sheet being conveyed along a sheet-conveying direction in the inkjet printer in the embodiment according to one or more aspects of the present invention.

FIGS. 9A-9E illustrate amplitudes in ripples in the recording sheet in a wave shape and fluctuation of amounts of a gap between an ink discharging surface and the recording sheet in the inkjet printer in the conditions illustrated in FIGS. 8A-8F in the embodiment according to one or more aspects of the present invention.

Figure 10:
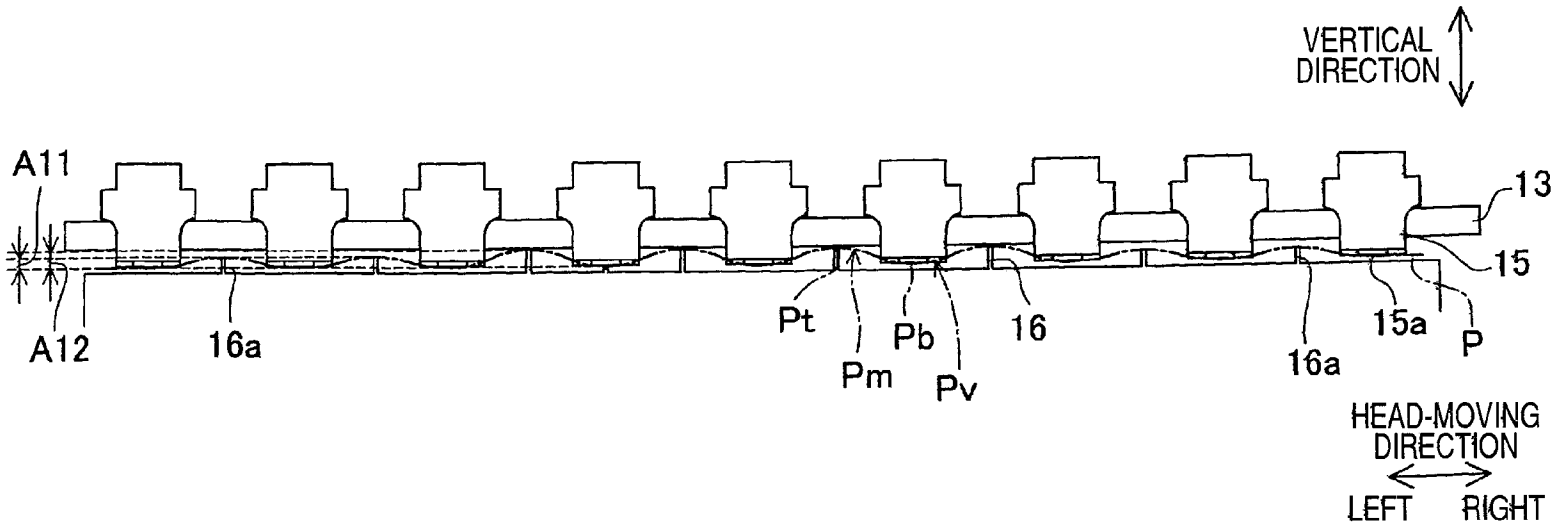

FIG. 10 is a first modified example of the part of the printing unit when viewed along the arrow IIIA shown in FIG. 2 in the embodiment according to one or more aspects of the present invention.

Figure 8A:
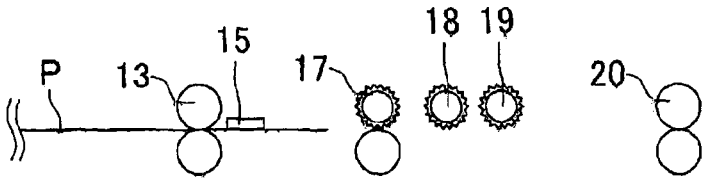
Figure 8B:
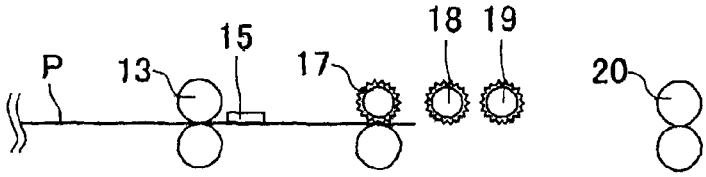
Figure 8C:
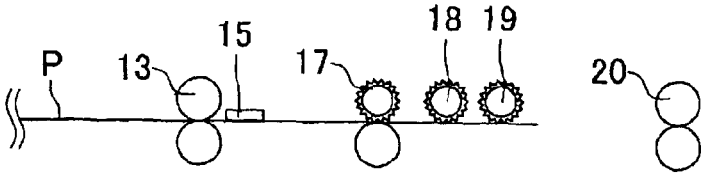
Figure 8D:
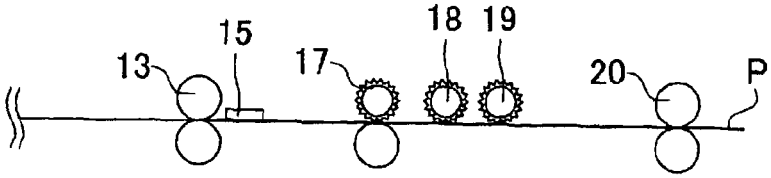
Figure 8E:
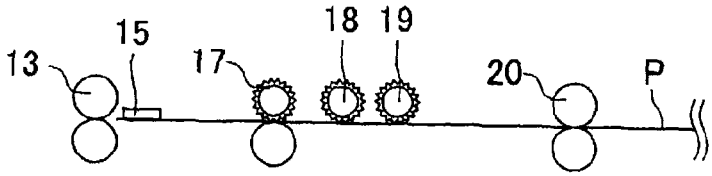
Figure 8F:
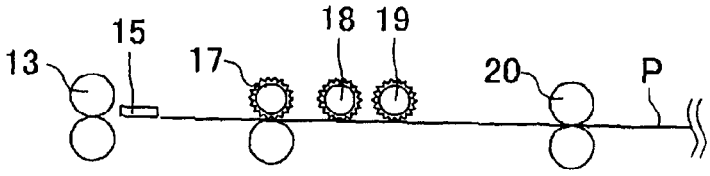
Figure 11:
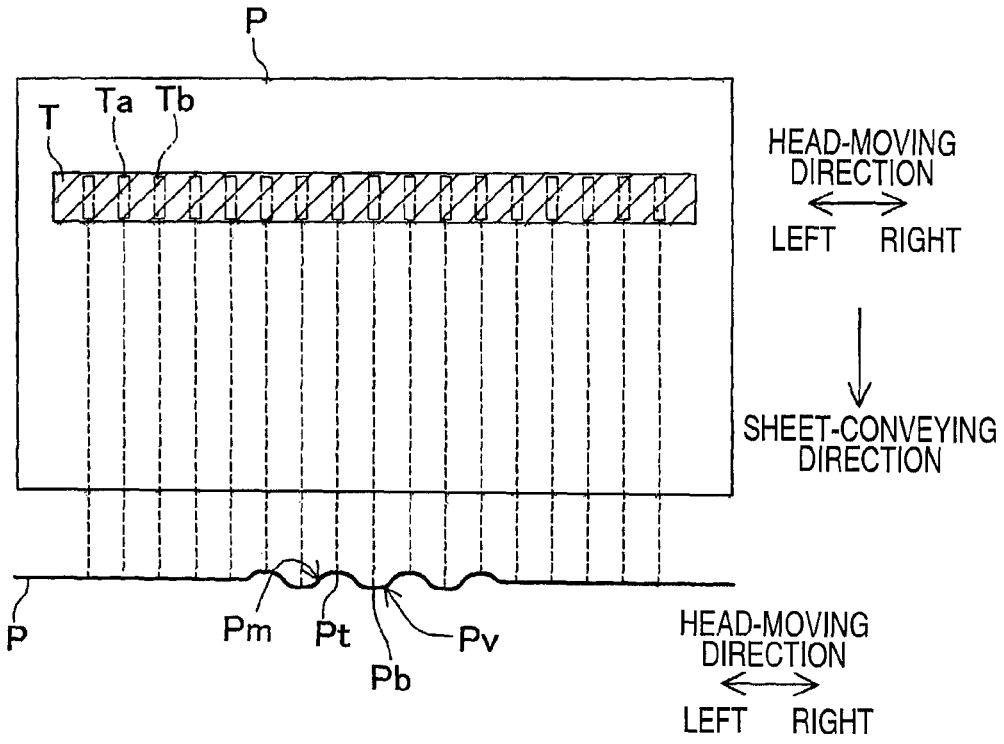

FIG. 11 illustrates a condition of the recording sheet in the first modified example when the recording sheet being conveyed along the sheet-conveying direction in the inkjet printer reaches a position illustrated in FIG. 8F in the embodiment according to one or more aspects of the present invention.

Figure 12:
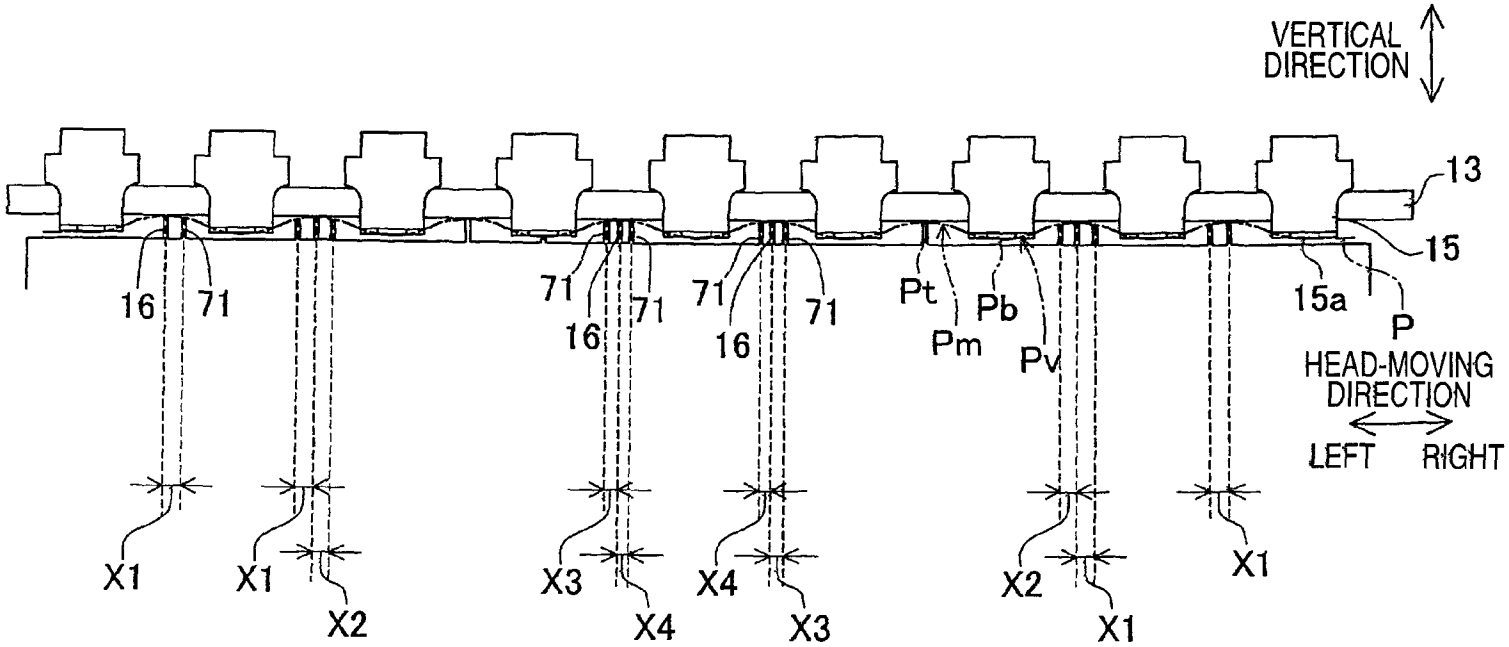

FIG. 12 is a second modified example of the part of the printing unit when viewed along the arrow IIIA shown in FIG. 2 in the embodiment according to one or more aspects of the present invention.

Figure 13A:
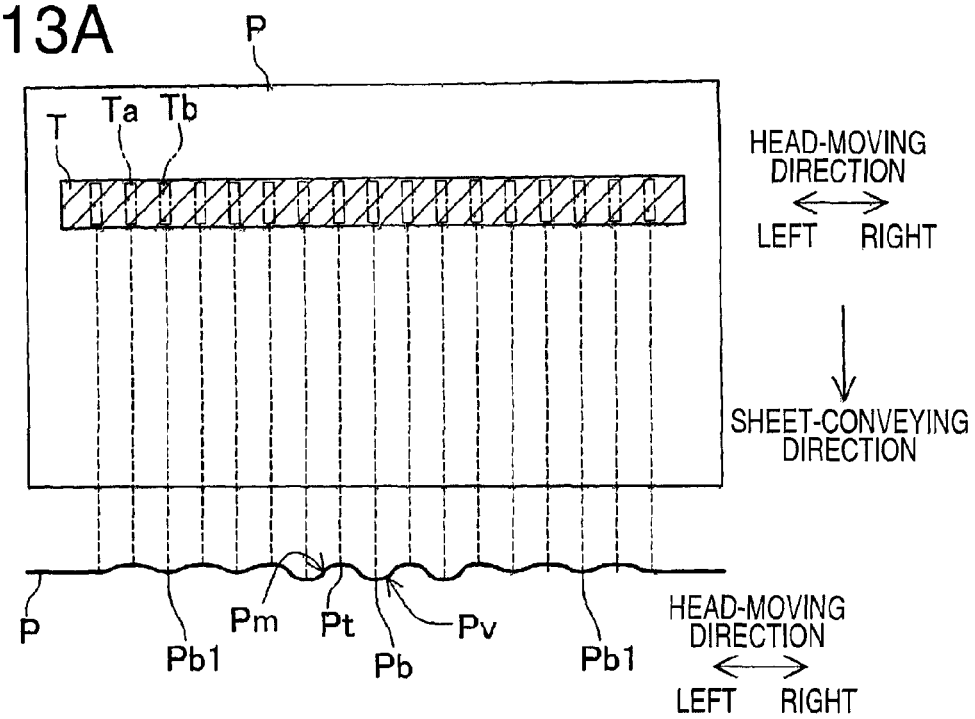
Figure 13B:
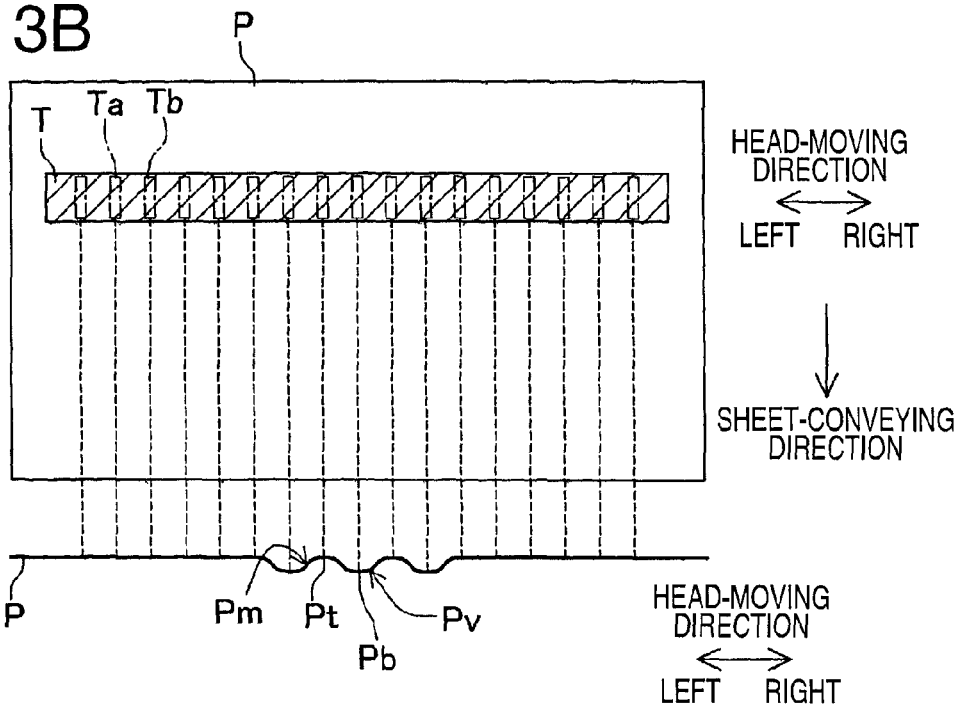

FIGS. 13A and 13B illustrates conditions of the recording sheet in the second modified example when the recording sheet being conveyed along the sheet-conveying direction in the inkjet printer reaches a position illustrated in FIG. 8F in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described in detail with reference to the accompanying drawings.

An inkjet printer 1 of the embodiment is a multi-function peripheral having a plurality of functions such as a printing function to perform printing on a recording sheet P and an image reading function. The inkjet printer 1 includes a printing unit 2 (see FIG. 2), a sheet feeding unit 3, a sheet ejecting unit 4, a reading unit 5, an operation unit 6, and a display unit 7. Further, the inkjet printer 1 includes a control device 50 configured to control operations of the inkjet printer 1 (see FIG. 5).

The printing unit 2 is provided inside the inkjet printer 1. The printing unit 2 is configured to perform printing on the recording sheet P. A detailed configuration of the printing unit 2 will be described later. The sheet feeding unit 3 is configured to feed the recording sheet P to be printed by the printing unit 2. The sheet ejecting unit 4 is configured to eject the recording sheet P printed by the printing unit 2. The reading unit 5 is configured to be, for instance, an image scanner for reading images such as below-mentioned deviation detectable patterns for detecting displacement of ink droplets landing on the recording sheet P. The operation unit 6 is provided with buttons. A user is allowed to operate the inkjet printer 1 via the buttons of the operation unit 6. The display unit 7 is configured, for instance, as a liquid crystal display, to display information when the inkjet printer 1 is used.

Subsequently, the printing unit 2 will be described. As shown in FIGS. 2 to 4, the printing unit 2 includes a carriage 11, an inkjet head 12, a feed roller 13, a platen 14, a plurality of corrugated plates 15, a plurality of ribs 16, an ejection roller 17, and a plurality of corrugated spur wheels 18, 19, a switchback roller 20, sheet sensors 21, 22, and a medium sensor 23. It is noted that, for the sake of easy visual understanding in FIG. 2, the carriage 11 is indicated by a dash-and-two-dots line, and portions disposed below the carriage 11 are indicated by solid lines.

The carriage 11 is configured to reciprocate on a guiderail (not shown) along a predetermined head-moving direction. The inkjet head 12 is mounted on the carriage 11 to be driven along with the carriage 11. The inkjet head 12 is configured to discharge ink from a plurality of nozzles 10 formed in an ink discharging surface 12a that is a lower surface of the inkjet head 12. It is noted that, the inkjet head 12 may be a line head extending over a whole length of a printable area in the head-moving direction. In this case, a head scanning mechanism such as the carriage 11 may not be provided, and a longitudinal (extending) direction of the line head may replace the head-moving direction.

The feed roller 13 includes two rollers configured to nip therebetween the recording sheet P fed by the sheet feeding unit 3 and feed the recording sheet P in a predetermined sheet-conveying direction, which is orthogonal to the head-moving direction. The platen 14 is disposed to face the ink discharging surface 12a. The recording sheet P is fed by the feed rollers 13, along an upper surface of the platen 14.

The plurality of corrugated plates 15 are disposed to face an upper surface of an upstream end of the platen 14 along the sheet-conveying direction. The plurality of corrugated plates 15 are arranged at substantially even intervals along the head-moving direction. The recording sheet P, fed by the feed rollers 13, passes between the platen 14 and the corrugated plates 15. At this time, pressing surfaces 15a, which are lower surfaces of the plurality of corrugated plates 15, press the recording sheet P from above.

Each of the plurality of ribs 16 is disposed between a corresponding two of mutually adjacent corrugated plates 15 along the head-moving direction, on the upper surface of the platen 14. The plurality of ribs 16 are arranged at substantially even intervals along the head-moving direction. Each rib 16 protrudes from the upper surface of the platen 14 up to a level higher than the pressing surfaces 15a of the corrugated plates 15. Each rib 16 extends from an upstream end of the platen 14 toward a downstream side along the sheet-conveying direction. Thereby, the recording sheet P on the platen 14 is supported from underneath by the plurality of ribs 16.

The ejection roller 17 includes two rollers configured to nip therebetween portions of the recording sheet P that are located in the same positions as the plurality of ribs 16 along the head-moving direction and feed the recording sheet P toward the sheet ejecting unit 4. An upper one of the ejection rollers 17 is provided with spur wheels so as to prevent the ink attached onto the recording sheet P from being transferred to the upper ejection roller 17.

The plurality of corrugated spur wheels 18 are disposed substantially in the same positions as the corrugated plates 15 along the head-moving direction, at a downstream side relative to the ejection rollers 17 along the sheet-conveying direction. The plurality of corrugated spur wheels 19 are disposed substantially in the same positions as the corrugated plates 15 along the head-moving direction, at a downstream side relative to the corrugated spur wheels 18 in the sheet-conveying direction. In addition, the plurality of corrugated spur wheels 18 and 19 are placed at a level lower than a position where the ejection rollers 17 nip the recording sheet P therebetween, along the vertical direction. The plurality of corrugated spur wheels 18 and 19 are configured to press the recording sheet P from above at the level. Further, the plurality of corrugated spur wheels 18 and 19 are not rollers having a smooth outer circumferential surface but a spur wheel. Therefore, it is possible to prevent the ink attached onto the recording sheet P from being transferred to the plurality of corrugated spur wheels 18 and 19.

Thus, the recording sheet P on the platen 14 is pressed from above by the plurality of corrugated plates 15 and the plurality of corrugated spur wheels 18 and 19, and is supported from below by the plurality of ribs 16. Thereby, as shown in FIG. 3, the recording sheet P on the platen 14 is bent and deformed in such a wave shape that mountain portions Pm protruding upward (i.e., toward the ink discharging surface 12a) and valley portions Pv recessed downward (i.e., in a direction opposite to the direction toward the ink discharging surface 12a) are alternately arranged along the head-moving direction. Further, each mountain portion Pm has a top portion Pt, protruding up to the highest position of the mountain portion Pm, which is located substantially in the same position as the center of the corresponding rib 16 in the head-moving direction. Each valley portion Pv has a bottom portion Pb, recessed down to the lowest position of the valley portion Pv, which is located substantially in the same position as the corresponding corrugated plates 15 and the corresponding corrugated spur wheels 18 and 19.

The switchback roller 20 includes two rollers, which are arranged on the downstream side relative to the corrugated spur wheels 19 in the sheet-conveying direction. If images are to be printed on both sides of the recording sheet P in a double-face printing operation, and when the recording sheet P with the image having been formed on one of the two sides is conveyed to the switchback rollers 20, the switchback rollers 20 provide a switchback mechanism to convey the recording sheet P underneath the platen 14 and direct to an upstream side with respect to the feed rollers 13 once again. Further, when the printing operation to the recording sheet P is completed, the switchback rollers 20, along with the ejection rollers 17, convey the recording sheet P having been through the printing operation toward the downstream side along the sheet-conveying direction to the sheet ejection unit 4. The switchback mechanism, other than the switchback rollers 20 in the present embodiment, may be in a known configuration. Therefore, detailed explanation of the switchback mechanism is herein omitted.

The sheet sensor 21 is arranged on an upstream side with respect to the feed rollers 13 along the sheet-conveying direction and is configured to detect presence or absence of the recording sheet P. The sheet sensor 21 may be, for example, an optical sensor. The sheet sensor 22, on the other hand, is arranged on a downstream side with respect to the corrugated spur wheel 19 along the sheet-conveying direction. The sheet sensor 22 in the present embodiment includes a lever 22a. The lever 22a is arranged to have a tip end thereof in a position, through which the recording sheet P being conveyed by the ejection rollers 17 passes. Therefore, when the recording sheet P conveyed by the ejection rollers 17 reaches the tip end of the lever 22a, the lever 22a is uplifted by the recording sheet P being conveyed. Thus, presence of the recording sheet P is detected via the uplifted movement of the lever 22a. When the uplifted movement is not sensed, it is determined that no recording sheet P is present at the position of the sheet sensor 22.

The medium sensor 23 is mounted on the carriage 11 and is configured to detect whether there is a recording sheet P on the platen 14. Specifically, for instance, the medium sensor 20 includes a light emitting element and a light receiving element. The medium sensor 20 emits light from the light emitting element toward the upper surface of the platen 14. The upper surface of the platen 14 is black. Therefore, when there is no recording sheet P on the platen 14, the light emitted from the light emitting element is not reflected by the upper surface of the platen 14 or received by the light receiving element. Meanwhile, when there is a recording sheet P on the platen 14, the light emitted from the light emitting element is reflected by the recording sheet P and received by the light receiving element. Thus, the medium sensor 20 detects presence of the recording sheet P on the platen 14, based on whether the light receiving element receives the light emitted from the light emitting element.

The printing unit 2 configured as above performs printing on the recording sheet P by discharging ink from the inkjet head 12 reciprocating together with the carriage 11 along the head-moving direction, while conveying the recording sheet P in the sheet-conveying direction by the feed rollers 13, the ejection rollers 17, and the switchback rollers 20. The ejection rollers 17 and the feed rollers 13 are arranged in positions to have the inkjet head 12 interposed therebetween along the sheet-conveying direction.

Next, an explanation will be provided about the control device 50 for controlling the operations of the inkjet printer 1. The control device 50 includes a central processing unit (CPU), a read only memory (ROM), a random access memory (RAM), and control circuits. The control device 50 is configured to function as various elements such as a recording control unit 51, a reading control unit 52, a positional deviation acquiring unit 53, a positional deviation storage unit 54, a sheet position detecting unit 55, a positional deviation correcting unit 56, and a discharging timing determining unit 57 (see FIG. 5).

The recording control unit 51 controls behaviors of the carriage 11, the inkjet head 12, the feed rollers 13, the ejection rollers 17, and the switchback rollers 20 when images including deviation detectable patterns Q, which will be described later in detail, are printed. The reading controller 52 controls behaviors of the reading unit 5 when images, including the deviation detectable patterns Q, appearing on a recording sheet is read. The positional deviation acquiring unit 53 acquires amounts of positional deviation of ink droplets landing on the top portions Pt and the bottom portions Pb of the recording sheet P, from the below-mentioned deviation detectable patterns Q read by the reading unit 5. It is noted that the amounts of positional deviation detected based on the deviation detectable patterns Q may be referred to as "gap information," which is information related to a gap between the ink discharging surface 12a and each of the top portions Pt and the bottom portions Pb. The positional deviation storage unit 54 stores the amounts of positional deviation detected from the deviation detectable patterns Q, i.e., the gap information, acquired by the positional deviation acquiring unit 53.

The sheet position detecting unit 55 is configured to detect a position of the recording sheet P being conveyed during a printing operation. More specifically, a position of a leading edge of the recording sheet P being conveyed is detected in consideration of a conveying capacity of the feed rollers 13 and the ejection rollers 17 and a time period starting from detection of presence of the recording sheet P by the sheet sensor 21. Further, a position of a rear edge of the recording sheet P being conveyed is detected in consideration of the conveying capacity of the feed rollers 13 and the ejection rollers 17, and a time period starting from detection of absence of the recording sheet P by the sheet sensor 21.

Further, the sheet position detecting unit 55 is configured to detect that the recording sheet P is conveyed without experiencing an error to the downstream side with respect to the ejection rollers 17 when the sheet sensor 22 detects presence of the recording sheet P (i.e., when the leading edge of the recording sheet P reaches the sheet sensor 22). Thereafter, when the sheet sensor 22 starts detecting absence of the recording sheet P, in other words, when the sheet sensor 22 does not detect presence of the recording sheet P any more (i.e., when the rear edge of the recording sheet P passes by the sheet sensor 22), the sheet position detecting unit 55 detects that the recording sheet P is conveyed to a position, in which the recording sheet P starts to be carried by the switchback rollers 20.

The positional deviation correcting unit 56 corrects amounts of the positional deviation stored in the positional deviation storage unit 54 according to a position of the recording sheet P being conveyed along the sheet-conveying direction. The discharging timing determining unit 57 determines ink discharging timing (moments) to discharge ink from the nozzles 10, based on the positional deviation amounts corrected by the positional deviation correcting unit 56.

Subsequently, an explanation will be provided about a process to determine the ink discharging timing to discharge ink from the nozzles 10 in the inkjet printer 1. In order to determine the ink discharging timing to discharge the ink droplets from the nozzles 10, the control device 50 executes a flow including steps S101, S102 shown in FIG. 6A prior to activating the printing operation. Further, during an active printing operation, the control device 50 executes a flow including steps S201-S203 shown in FIG. 6B.

In S101, the control device 50, more specifically, the recording control unit 51, manipulates the printing unit 2 to print, a patch T including a plurality of deviation detectable patterns Q on the recording sheet P located in a predetermined reference position along the sheet-conveying direction. More specifically, for instance, the control device 50 controls the printing unit 2 to print a plurality of straight lines L1, which extend in parallel with the sheet-conveying direction and are arranged along the head-moving direction, by discharging ink from the nozzles 10 while moving the carriage 11 in one orientation (e.g., rightward) along the head-moving direction. After that, the control device 50 controls the printing unit 2 to print a plurality of straight lines L2, which are tilted with respect to the sheet feeding direction and intersect the plurality of straight lines L1, respectively, by discharging ink from the nozzles 10 while moving the carriage 11 in the other direction (e.g., leftward) along the head-moving direction. Thereby, as shown in FIG. 7B, the patch T including the plurality of deviation detectable patterns Q arranged along the head-moving direction is printed. Each positional deviation detecting pattern Q includes a combination of the mutually intersecting straight lines L1 and L2. At this time, ink droplets are discharged from the nozzles 10 in accordance with design-based ink discharging timing that is determined, for example, based on an assumption that the recording sheet P is not in the wave shape but flat. Alternatively, if the positional deviation amounts are adjusted preliminarily in advance, and the ink discharging timing is previously determined preliminarily in accordance with below-mentioned procedures, ink droplets may be discharged from the nozzles 10 in accordance with the preliminarily determined ink discharging timing.

Next, in S102, the control device 50, in particular, the reading control unit 52, controls the reading unit 5 to read the printed deviation detectable patterns Q, and the control device 50, in particular, the positional deviation acquiring unit 53, acquires the positional deviation amounts of ink droplets landing on the top portions Pt and the bottom portions Pb. The acquired positional deviation amounts, i.e., the gap information, are stored in the positional deviation storage unit 54.

More specifically, for example, when the deviation detectable patterns Q as shown in FIGS. 7A and 7B are printed in a situation where there is a deviation between the ink landing position in the rightward movement of the carriage 11 and the ink landing position in the leftward movement of the carriage 11, the straight line L1 and the straight line L2 of each deviation detectable pattern Q are printed to be displaced with respect to each other along the head-moving direction. Therefore, the straight line L1 and the straight line L2 intersect each other in a position displaced from centers of the straight lines L1 and L2 along the sheet-conveying direction depending on the positional deviation amount with respect to the ink landing positions along the head-moving direction. Further, when the reading unit 5 reads each deviation detectable pattern Q, the reading unit 5 detects a higher degree of brightness at the intersection of the straight lines L1 and L2 than the brightness at any other portion of the read deviation detectable pattern Q. Accordingly, by reading each individual deviation detectable pattern Q and acquiring a position with the highest degree of brightness within the read deviation detectable pattern Q, it is possible to detect the position of the intersection of the straight lines L1 and L2.

In the embodiment, the control device 50, more specifically, the reading control unit 52, controls the reading unit 5 to read deviation detectable patterns Q, of the plurality of deviation detectable patterns Q, in a section Ta and a section Tb that respectively correspond to each top portion Pt and each bottom portion Pb within the patch T. Further, the control device 50, more specifically, the positional deviation acquiring unit 53, acquires the position with the highest degree of brightness within each individual read deviation detectable pattern Q, so as to acquire the positional deviation amounts of ink droplets landing on the plurality of top portions Pt and the plurality of bottom portions Pb. The acquired positional deviation amounts are stored in the positional deviation storage unit 54.

As described above, in S102, the control device 50 controls the reading unit 5 to read only the deviation detectable patterns Q in the sections Ta and the sections Tb. Therefore, in S101, the control device 50 may control the printing unit 2 to print at least the deviation detectable patterns Q in the sections Ta and the sections Tb.

Further, when a printing operation is activated, in S201, the control device 50, more specifically, the sheet position detecting unit 55, detects positions of a leading edge and a rear edge of a recording sheet P being conveyed based on results detected by the sheet sensor 21.

The positions of the recording sheet P being conveyed during the printing operation will be described with reference to FIGS. 8A-8F. First, as the recording sheet P is conveyed, the recording sheet P is placed in a condition as shown in FIG. 8A, in which the recording sheet P is nipped by the feed rollers 13 and pressed downward by the corrugated plates 15. Thereafter, when the leading edge of the recording sheet P reaches the ejection rollers 17, as shown in FIG. 8B, the recording sheet P is placed in a condition, in which the recording sheet P is nipped by the ejection rollers 17 in addition to being nipped by the feed rollers 13 and pressed by the corrugated plates 15.

Further, when the recording sheet P reaches the corrugated spur wheels 18 and 19, as shown in FIG. 8C, the recording sheet P is place in a condition, in which the recording sheet P is pressed by the corrugated spur wheels 18 and 19, in addition to being nipped by the feed rollers 13 and the ejection rollers 17 and being pressed by the corrugated plates 15. Thereafter, when the leading edge of the recording sheet P reaches the switchback rollers 20, as shown in FIG. 8D, the recording sheet P is placed in a condition, in which the recording sheet P is nipped by the switchback rollers 20, in addition to being nipped by the feed rollers 13 and the ejection rollers 17 and being pressed by the corrugated plates 15 and the corrugated spur wheels 18, 19. Furthermore, when the rear edge of the recording sheet P passes through the feed rollers 13, the recording sheet P is placed in a condition, in which the recording sheet P is released from the feed rollers 13 but is nipped by the ejection rollers 17 and the switchback rollers 20 and pressed by the corrugated plates 15 and the corrugated spur wheels 18, 19.

Thereafter, when the rear edge of the recording sheet P passes through the corrugated plates 15, as shown in FIG. 8F, the recording sheet P is placed in a condition, in which the recording sheet P is released from the pressure from the corrugated plates 15 but is nipped by the ejection rollers 17 and the switchback rollers 20 and pressed by the corrugated spur wheels 18, 19.

It is to be noted that the positions of the leading edge and the rear edge of the recording sheet P change within the positions shown in FIGS. 8A-8F depending on the position of the recording sheet P. In other words, the position of the recording sheet P among the positions shown in 8A-8F can be determined by the positions of the leading edge and the rear edge of the recording sheet P. Therefore, in S201, the positions of the leading edge and the rear edge of the recording sheet P are detected in order to determine the position of the recording sheet P along the sheet-conveying direction.

In S202, the control device 51, in particular, the positional deviation correcting unit 56 corrects the amounts of positional deviation of the ink droplets, acquired in S102 by the positional deviation acquiring unit 53, in consideration of the positions of the leading edge and the rear edge of the recording sheet P, which are detected in S201.

More specifically, while the recording sheet P can be held in the rippled wave shape by the pressure from the corrugated plates 15 and the corrugated spur wheels 18, 19, the recording sheet P in the conditions shown in FIGS. 8A and 8B is held in the rippled form by the pressure solely from the corrugated plates 15 but is not pressed by the corrugated spur wheels 18, 19. Meanwhile, in the conditions shown in FIGS. 8C-8E, the recording sheet P is held in the rippled form by the pressure from both of the corrugated plates 15 and the corrugated spur wheels 18, 19. In the condition shown in FIG. 8F, the recording sheet P is held in the rippled form by the pressure from the corrugated spur wheels 18, 19 but is not pressed by the corrugated plates 15.

It is to be noted that the condition to hold the recording sheet P changes depending on the members, by which the recording sheet P is pressed to be in the rippled form, between the corrugated plates 15 and the corrugated spur wheels 18, 19. As the condition to hold the recording sheet P changes, amplitude between the tops Pt of the mountain portions Pm and the bottoms Pb of the valley portions Pv and a height (an average level) of the entire recording sheet P change.

Further, while the recording sheet P can be nipped by one or more of the feed rollers 13, the ejection rollers 17, and the switchback rollers 20, when in the condition shown in FIG. 8A, the recording sheet is nipped solely by the feed rollers 13. Meanwhile, in the conditions shown in FIGS. 8B and 8C, the recording sheet P is nipped by the feed rollers and the ejection rollers 17. When the recording sheet P is in the condition shown in FIG. 8D, the recording sheet P is nipped by the feed rollers 13, the ejection rollers 17, and the switchback rollers 20. When the recording sheet P is in the condition shown in FIGS. 8E and 8F, the recording sheet P is nipped by the ejection rollers 17 and the switchback rollers 20.

It is to be noted that the condition to hold the recording sheet P changes depending on the members, by which the recording sheet P is nipped, among the feed rollers 13, the ejection rollers 17, and the switchback rollers 20. As the condition to hold the recording sheet P changes, the amplitude between the tops Pt of the mountain portions Pm and the bottoms Pb of the valley portions Pv and the height (the average level) of the entire recording sheet P change.

Figure 9A:
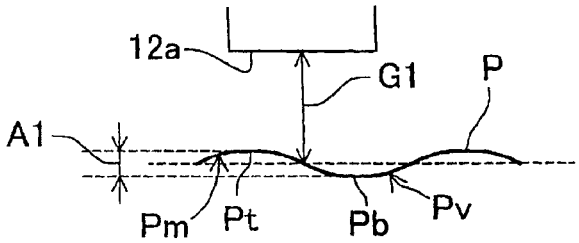
Figure 9B:
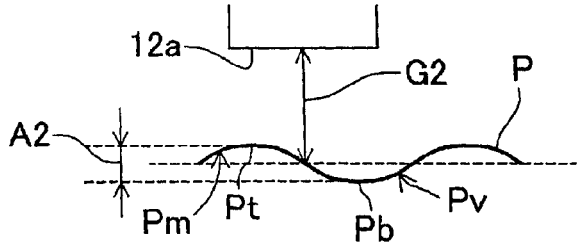
Figure 9C:
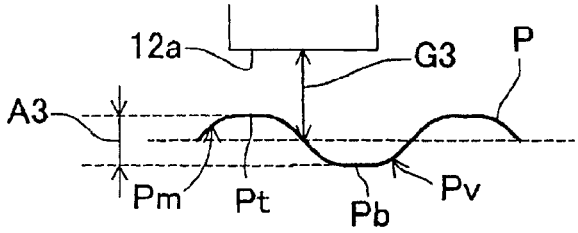
Figure 9D:
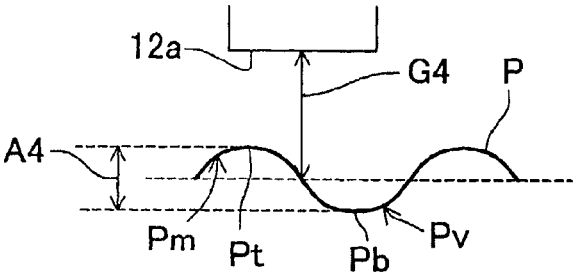
Figure 9E:
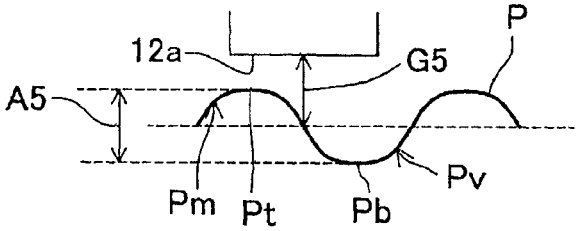

More specifically, variation of the amplitudes in the ripples in the recording sheet P and the amounts of the gap between the average level of the entire recording sheet P and the ink discharging surface 12a are shown in FIGS. 9A-9E. FIG. 9A illustrates the condition of the recording sheet P before the leading edge of the recording sheet P reaches the ejection rollers 17 (see FIG. 8A). FIG. 9B illustrates the condition of the recording sheet P after the leading edge reached the ejection rollers 17 and before the leading edge reaches the switchback rollers 20 (see FIGS. 8B, 8C). FIG. 9C illustrates the condition of the recording sheet P after the leading edge reached the switchback rollers 20 and before the rear edge passes through the feed rollers 13 (see FIG. 8D). FIG. 9D illustrates the condition of the recording sheet P after the rear edge of the recording sheet P passed by the corrugated plates 15 (see FIG. 8E). FIG. 9E illustrates the condition of the recording sheet P after the rear edge of the recording sheet P passed by the corrugated plates 15 (see FIG. 8F).

As seen in FIGS. 9A-9E, the amplitudes (A1-A5) of the ripples in the recording sheet P becomes greater as the recording sheet P is conveyed farther downstream along the sheet-conveying direction (i.e., A5>A4>A3>A2>A2). Meanwhile, the amounts of the gap (G1-G5) between each average height of the recording sheet P and the ink discharging surface 12a is the greatest in the condition shown in FIG. 9D and decreases to be smaller in an order: the condition shown in FIG. 9B, the condition shown in FIG. 9A, the condition shown in FIG. 9C, and the condition shown in FIG. 9E (G4>G2>G1>G3>G5).

Thus, the amplitude in the ripples in the recording sheet P and the vertical position of the entire recording sheet P vary depending on the position of the recording sheet P along the sheet-conveying direction. Therefore, if the ink droplets are discharged from the nozzles at constant timings regardless of the positions of the recording sheet P along the sheet-conveying direction, the amounts of positional deviation of the ink droplets landing on the recording sheet P become different depending on the condition of the recording sheet P, which is in one of the conditions shown in FIGS. 8A-8F. Thus, the amounts of positional deviation change as the recording sheet P is being conveyed along the sheet-conveying direction within a printing operation.

Meanwhile, the deviation detectable patterns Q having been printed in S101 are printed on the recording sheet P, which is in one of the conditions shown in FIGS. 8A-8F. The condition of the recording sheet P, among the conditions shown in FIGS. 8A-8F, depends on a size of the recording sheet P and a range, in which the deviation detectable patterns Q are printed. Therefore, the deviation detectable patterns Q indicate amounts of positional deviation on a recording sheet P, which is located in the same reference position as the recording sheet P being located when the deviation detectable patterns Q were printed on the recording sheet P in S101.

Therefore, in S202, the control device 50, more specifically, the positional deviation correcting unit 56, corrects the amounts of positional deviation acquired in S102 with respect to the position (more specifically, the positions of the leading edge and the rear edge) of the recording sheet P, which is to be used in the current printing operation, along the sheet-conveying direction. In particular, the positional deviation correcting unit 56 corrects the amounts of positional deviation in consideration of the variation of the amplitude in the ripples in the recording sheet P and the vertical position (height) of the entire recording sheet P.

The amounts of correction in consideration of the amplitude in the ripples in the recording sheet P and the height of the recording sheet P may be acquired, for example, in a following method. That is, when the amount of positional deviation acquired in S102 is represented by Y, and an amount of positional deviation after being corrected is represented by Y', Y' is obtained by a formula, $Y'=a \cdot Y+b$. In this respect, "a" represents a value, which is set depending on a ratio of amplitude in the ripples in the current recording sheet P with respect to the amplitude in the ripples in the former recording sheet P used in S101. Meanwhile, "b" represents a value, which is set depending on a ratio of an amount of the gap between the ink discharging surface 12a and the current recording sheet P with respect to the amount of the gap between the ink discharging surface 12a and the former recording sheet P used in S101.

In S203, the control device 50, more specifically, the discharging timing determining unit 57, determines the timing to discharge the ink droplets from the nozzles 10 according to the corrected amounts of positional deviation, which is acquired in S202. In this respect, it is noted that, in S102, the control device 50 acquires only the positional deviation amounts on the top portions Pt and the bottom portions Pb. In the embodiment, the recording sheet P is deformed in the ripples with the top portions Pt and the bottom portions Pb alternately arranged, by the plurality of corrugated plates 15, the plurality of ribs 16, and the plurality of corrugated spur wheels 18 and 19. Therefore, by obtaining the positional deviation amounts on the top portions Pt and the bottom portions Pb, it is possible to estimate positional deviation amounts on portions of the mountain portions Pm other than the top portions Pt and on portions of the valley portions Pv other than the bottom portions Pb. Accordingly, the control device 50 determines the ink discharging timing to discharge ink onto the portions of the mountain portions Pm other than the top portions Pt and onto the portions of the valley portions Pv other than the bottom portions Pb, based on the estimated positional deviation amounts.

It is noted that, in S102, the control device 50 may read the deviation detectable patterns Q on the portions of the mountain portions Pm other than the top portions Pt and the portions of the valley portions Pv other than the bottom portions Pb, and may obtain positional deviation amounts from the read deviation detectable patterns Q to determine the ink discharging timing to discharge ink from the nozzles 10, based on the obtained positional deviation amounts and in consideration of the position of the recording sheet P along the sheet-conveying direction. However, in this case, the quantity of the positional deviation amounts obtained by the positional deviation acquiring unit 53 and stored in the positional deviation storage unit 54 is large, and it requires a large capacity of RAM for the control device 50.

According to the embodiment described above, when the recording sheet P is deformed in the wave shape with the plurality of mountain portions Pm and the plurality of valley portions Pv alternately arranged along the head-moving direction, amounts of the gap between the ink discharging surface 12a and the recording sheet P vary depending on portions (areas) on the recording sheet P. Further, when the amounts of the gap between the ink discharging surface 12a and the recording sheet P vary depending on portions (areas) on the recording sheet P, there are differences between the positional deviation amounts caused in the rightward movement of the carriage 11 and the positional deviation amounts caused in the leftward movement of the carriage 11. Therefore, in order to place ink droplets in appropriate positions on such a wave-shaped recording sheet P, it is required to determine the ink discharge timing to discharge the ink droplets from the nozzles 10 depending on the amount of the gap at each portion on the recording sheet P.

Thus, in the embodiment, by printing the deviation detectable patterns Q on the wave-shaped recording sheet P and reading the printed deviation detectable patterns Q, the control device 50 acquires the amounts of positional deviation on the top portions Pt and the bottom portions Pb.

In this respect, however, the amplitude of the ripples in the recording sheet P and the vertical position of the recording sheet P vary depending on the position of the recording sheet P along the sheet-conveying direction. Therefore, in S203, if the control device 50 determines the ink discharging timing to discharge ink from the nozzles 10 in the printing operation based on the amounts of positional deviation acquired in S102 but regardless of the position of the recording sheet P along the sheet-conveying direction, actual ink-landing positions on the new recording sheet P are displaced from the ink-landing positions of the former recording sheet P, which is used in S101. Thus, quality of the printed image may be lowered.

Meanwhile, in the embodiment, when an image is printed on the new recording sheet P in the printing operation, the amounts of the positional deviation acquired from the deviation detectable patterns Q in S102 are corrected according to the position of the recording sheet P along the sheet-conveying direction. Thus, amounts of positional deviation corrected for the new recording sheet P can be acquired. In other words, preferably corrected amounts of positional deviation for the new recording sheet P in the printing operation can be acquired. Therefore, in S203, the ink discharging timing to discharge the ink droplets from the nozzles 10 for the new recording sheet P in the currently-active printing operation can be correctly determined.

Further, in the embodiment described above, the amplitude of the ripples in the recording sheet P and the vertical position of the entire recording sheet P differ depending on the members, by which the recording sheet P is held in the rippled form, between the corrugated plates 15 and the corrugated spur wheels 18, 19, and by which the recording sheet P is nipped, among the rollers 13, 17, 20. In the embodiment, therefore, the amounts of positional deviation with respect to the new recording sheet P are corrected in consideration of the position of the recording sheet P along the sheet-conveying direction. Thus, the amounts of positional deviation may be accurately corrected.

Furthermore, in the embodiment described above, the amounts of positional deviation on the new recording sheet P are corrected in consideration of the amplitude of the ripples in the recording sheet P and the vertical position of the entire recording sheet P. Thus, the amounts of positional deviation on the new recording sheet P may be corrected even more accurately.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations about the same configurations as exemplified in the aforementioned embodiment will be omitted.

In the aforementioned embodiment, the plurality of ribs 16 in the same height are arranged respectively in the midst positions along the head-moving direction between the adjoining corrugated plates 15. Accordingly, the amplitude of the ripples formed in the recording sheet P by the ribs 16 and the corrugated plates 15 are constant at the portions corresponding to the ribs 16 along the head-moving direction.

In a first modified example, as shown in FIG. 10, two ribs 16a at the outermost positions along the head-moving direction are formed to be smaller in height than the other ribs 16 on the inner side. The ribs 16a on the outermost positions are formed to be shorter at least in a following reason. That is, if the two ribs 16a are formed to be higher, the rippled recording sheet P on the ribs 16a may tend to be uplifted and float at the outer end ranges of the recording sheet P along the head-moving direction by own rigidity of the recording sheet P. Thus, the mountain portions Pm and the valley portions Pv may not be formed regularly along the head-moving direction. Therefore, in order to prevent the irregularity in the ripples, the ribs 16a may be formed to be smaller in the vertical direction to prevent the uplift.

In the above configuration, when the recording sheet P is in one of the conditions shown in FIGS. 8A-8E, the amplitude A11 at the portions corresponding to the ribs 16a is smaller than the amplitude A12 at the other portions corresponding to the ribs 16. When the rear edge of the recording sheet P passes by the corrugated plates 15, in the condition shown in FIG. 8F, the outer end ranges in the recording sheet P along the head-moving direction do not form the mountain portions Pm or the valley portions Pv but extend flat (see FIG. 11). Therefore, in the first modified example with the shorter ribs 16a, when the recording sheet P is in the condition shown in FIG. 8F, the ink discharging timing to have the ink droplets land on the outer end ranges in the recording sheet P is not corrected based on the amounts of positional deviation acquired in S102. Rather, the ink droplets are discharged to the outer end ranges according to discharging timing, which is set for a recording sheet P being not rippled but flat.

In a second modified example, as shown in FIG. 12, auxiliary ribs 71 having the same height which is lower than the height of the ribs 16 are formed at the right side of the leftmost rib 16, at both the left and right sides of each of the second, fourth, fifth, and seventh ribs from the left end in the head-moving direction, and at the left side of the rightmost rib 16. Among the plurality of auxiliary ribs 71, an auxiliary rib 71 closer to one of the corrugated plates 15 on an outer side along the head-moving direction is disposed across a longer distance from its accompanying rib 16 than a distance between an auxiliary rib 71 farther from the one of the corrugated plates on the outer side along the head-moving direction and its accompanying rib 16. Namely, in FIG. 12, a distance X1 is longer than a distance X2, the distance X2 is longer than a distance X3, and the distance X3 is longer than a distance X4 (X1>X2>X3>X4).

It is to be noted, in order to deform the recording sheet P in the rippled form, that the recording sheet P is pulled inward from the outer sides toward a central area of the recording sheet P along the head-moving direction to be pressed downward by the corrugated plates 15. In this respect, it is more difficult to press the recording sheet P downward by the corrugated plates 15 at the central area than the outer areas. If the auxiliary ribs 71 are formed in evenly-spaced arrangement, therefore, due to the pressing difficulty at the central area, the recording sheet P may not be formed in the regular ripples at the central area.

In consideration of the pressing difficulty at the central area, therefore, in the second modified example, the distance between the auxiliary rib 71 and its accompanying rib 16 along the head-moving direction is set to be greater (wider) as the position of the auxiliary rib 71 is closer to the outside along the head-moving direction (i.e., the closer to the outer sides along the head-moving direction the auxiliary rib 16 is, the greater the distance between the auxiliary rib 71 and its accompanying rib 16 along the head-moving direction becomes). With the widely-spaced auxiliary ribs 71, it is more difficult to press the recording sheet P downward by the corrugated plates 15 in the outer areas in the recording sheet P compared to the central area. In other words, the widely-spaced auxiliary ribs 71 in the outer areas allow the corrugated plates 15 to press the recording sheet P downward more easily at the central area than the outer areas. Thus, easiness of pressing downward is equalized relatively throughout the recording sheet P along the head-moving direction, and the recording sheet P can be deformed into the regular rippled form steadily.

With the unevenly-arranged auxiliary ribs 71, the auxiliary ribs 71 arranged at the positions closer to the outside along the head-moving direction support the recording sheet P from below at the positions closer to the corrugated plates 15 than the other auxiliary ribs 16 closer to the central area. In this respect, as has been described above, the recording sheet P is more difficult to be pressed downward by the corrugated plates 15 at the outer areas than the central area along the head-moving direction. Therefore, once the recording sheet P is released from the corrugated plates 15, i.e., in the condition shown in FIG. 8F, but the recording sheet P continues to be supported by the ribs 16 and the auxiliary ribs 71 from below, the valley portions Pv may not be formed regularly at the outer areas in the recording sheet P along the head-moving direction. In such a case, for example, as shown in FIG. 13A, a level of the valley portions Pb 1 at the outer areas may be substantially equivalent to the average height of the recording sheet P, and the amplitude of the ripples in the recording sheet P may be reduced in the outer areas. For another example, as shown in FIG. 13B, a level of the bottoms Pb of the valley portions Pv may be raised to be equivalent to a level of the tops Pt of the mountain portions Pm at the outer areas.

In such cases, when the recording sheet P comes to the position in the condition shown in FIG. 8F, the ink discharging timing to have the ink droplets land on the outer areas in the recording sheet P may be corrected in S202 differently from the other areas closer to the central area. In particular, when the recording sheet P is deformed into the irregular rippled form as shown in FIG. 13A, the amounts of positional deviation for the bottoms Pb at the outer areas may be replaced with amounts of positional deviation for the average height of the recording sheet P. When the recording sheet P is deformed into the irregular rippled form as shown in FIG. 13B, the amounts of positional deviation for the bottoms Pb at the outer areas may be replaced with amounts of positional deviation for the tops Pt of the mountain portions.

In the embodiment described above, the amounts of positional deviation are corrected in consideration of the members, by which the recording sheet P is held in the rippled form, between the corrugated plates 15 and the corrugated spur wheels 18, 19, or by which the recording sheet P is nipped, among the rollers 13, 17, 20. However, the correction may not necessarily be made in consideration of all of these factors.

In the inkjet printer 1, the inkjet head 12 is arranged in the position between the feed rollers and the ejection rollers 17 along the sheet-conveying direction, Meanwhile, the switchback rollers 20 are arranged in the downstream position with respect to the ejection rollers 17. In consideration of the positional relation, difference in amplitudes of the ripples in the recording sheet P and difference in vertical positions of the entire recording sheet P to be influenced by the switchback rollers 20 are relatively small compared to the difference in amplitudes of the ripples in the recording sheet P and the vertical positions of the recording sheet P influenced by the feed rollers 13 and the ejection rollers 17.

Therefore, the amounts of positional deviation may be corrected in consideration of the members, by which the recording sheet P is held in the rippled form, between the corrugated plates 15 and the corrugated spur wheels 18, 19, and by which the recording sheet P is nipped, between the rollers 13, 17. More specifically, the amounts of positional deviation may be corrected depending on the condition of the recording sheet P, whether the recording sheet P is in the condition shown in FIG. 8A, the conditions shown in FIGS. 8B-8D, or the conditions shown in FIG. 8E-8F.

In the embodiment described above, the inkjet printer 1 is equipped with the switchback mechanism including the switchback roller 20 in order to enable double-face printing. However, the inkjet printer 1 may not necessarily be equipped with the switchback mechanism if the double-face printing function is not required. When the inkjet printer 1 is not equipped with the switchback mechanism, the amounts of positional deviation may be corrected without considering the nipping effect of the switchback roller 20.

In the embodiment described above, the recording sheet P is deformed into the rippled form by being pressed by at least one of the corrugated plates 15 and the corrugated spur wheels 18, 19. Therefore, an extent of the variation in the amplitudes of the ripples in the recording sheet P caused by being pressed by the corrugated plates 15 and/or the corrugated spur wheels 18, 19, is greater than an extent of the variation in the amplitudes of the ripples in the recording sheet P caused by being nipped by the feed rollers 13, the ejection rollers 17, and/or the switchback rollers 20.

Therefore, the amounts of positional deviation may be corrected at least in consideration of the pressing effect from the corrugated plates 15 and/or the corrugated spur wheels 18, 19, without considering the nipping effect from the feed rollers 13, the ejection rollers 17, and/or the switchback rollers 20. More specifically, the amounts of positional deviation may be corrected depending on the condition of the recording sheet P, i.e., whether the recording sheet P is in the conditions shown in FIGS. 8A, 8B, the conditions shown in FIGS. 8C-8E, or the condition shown in FIG. 8F.

In the embodiment described above, the recording sheet P is pressed by the corrugated plates 15, which are arranged on the upstream side with respect to the inkjet head 12 along the sheet-conveying direction, and the corrugated spur wheels 18, 19, which are arranged on the downstream side with respect to the inkjet head 12 along the sheet-conveying direction. However, one of the corrugated plates 15 and the corrugated spur wheels 18, 19 may be omitted.

When one of the corrugated plates 15 and the corrugated spur wheels 18, 19 is omitted, the recording sheet P is pressed solely by the other one of the corrugated plates 15 and the corrugated spur wheels 18, 19 at all time while the recording sheet is in the rippled form. Therefore, the amounts of positional deviation may be corrected in consideration of the members, by which the recording sheet P is nipped among the feed rollers 13, the ejection rollers 17, and the switchback rollers 20 without considering the pressing effect from the other one of the corrugated plates 15 and the corrugated spur wheels 18, 19.

In the embodiment described above, in S202, the amounts of positional deviation of the ink droplets landing on the recording sheet P are corrected in consideration of the amplitude of the ripples in the recording sheet P and the vertical position of the entire recording sheet P, which depend on the position of the recording sheet P along the sheet-conveying direction. However, the amounts of positional deviation may not necessarily be corrected in consideration of all of these factors.

For example, the difference in vertical positions of the recording sheet P depending on the position of the recording sheet P along the sheet-conveying direction is relatively small compared to the difference in amplitudes of the ripples in the recording sheet P depending on the position of the recording sheet P along the sheet-conveying direction. Therefore, in S202, the amounts of positional deviation of the ink droplets landing on the recording sheet P may be corrected solely in consideration of the variation in the amplitudes of the ripples in the recording sheet P depending on the position of the recording sheet P along the sheet-conveying direction and without considering the variation in vertical positions of the recording sheet P depending on the position of the recording sheet P.

Further, the amounts of positional deviation may be corrected in consideration of other various factors, which may vary depending on the position of the recording sheet P along the sheet-conveying direction and may affect the amounts of the gap between the ink discharging surface 12a and each position in the rippled recording sheet P, but other than variations of the amplitudes of the ripples in the recording sheet P or the vertical positions of the entire recording sheet P.

In the aforementioned embodiment, the reading unit 5 of the inkjet printer 1 reads the printed deviation detectable patterns Q so as to acquire the positional deviation amounts on the top portions Pt and the bottom portions Pb. However, the configuration for reading the printed deviation detectable patterns Q to acquire and correct as needed the positional deviation amounts is not limited to the above configuration.

For example, the medium sensor 23 may read the deviation detectable patterns Q printed on the recording sheet P. In this case, when light emitted by the light emitting element of the medium sensor 23 is incident onto the straight lines L1 and L2 of a deviation detectable pattern Q, the light is not reflected thereat or received by the light receiving element. Meanwhile, when the light emitted by the light emitting element of the medium sensor 23 is incident onto a portion of the recording sheet P without any straight line L1 or L2 printed thereon, the light is reflected thereat and received by the light receiving element. Accordingly, it is possible to recognize presence of the straight lines L1 and L2 based on a determination as to whether the light receiving element of the medium sensor 23 receives the light emitted by the light emitting element. Thereby, it is possible to acquire a positional deviation amount from positional information on the intersection of the straight lines L1 and L2.

Alternatively, for instance, in a process for manufacturing the inkjet printer 1, a device different from the inkjet printer 1 may read the deviation detectable patterns Q printed by the inkjet printer 1 to acquire the positional deviation amounts.

In this case, for instance, the positional deviation amounts acquired or corrected by the device different from the inkjet printer 1 may be written into the positional deviation storage unit 54, and the positional deviation correcting unit 56 may correct the positional deviation amounts having been written in the positional deviation storage unit 54. Further, in this case, the inkjet printer 1 may not necessarily be a multi-function peripheral having the reading unit 5. The inkjet printer 1 may be provided with only a printing function.

In the aforementioned embodiment, the control device 50 controls the reading unit 5 to read the patch T including the plurality of deviation detectable patterns Q so as to acquire the positional deviation amounts. However, for instance, the positional deviation amounts may be acquired by a following alternative method. The method may include printing a plurality of patches T with respective ink discharging timings gradually differing by a predetermined time amount. The method may further include making the user select one of the plurality of patches T that includes a printed deviation detectable pattern Q with the straight lines L1 and L2 intersecting each other in a position closest to the center of the straight lines L1 and L2 along the sheet conveying direction (i.e., making the user select a patch T that includes a deviation detectable pattern Q printed with the smallest positional deviation amount) in comparison with the other patches T, with respect to each of the top portions Pt and the bottom portions Pb.

In the aforementioned embodiment, the control device 50 controls the printing unit 2 to print the deviation detectable patterns Q, each of which has the straight lines L1 and L2 intersecting each other, by discharging ink from the nozzles 10 while moving the carriage 11 rightward along the head-moving direction to print the straight line L1 and discharging ink from the nozzles 10 while moving the carriage 11 leftward along the head-moving direction to print the straight line L2.

However, for instance, the deviation detectable patterns may be printed in a following alternative method. The method may include printing a plurality of straight lines L2 on a recording sheet P, on which a plurality of lines similar to the straight lines L1 are formed in advance, by discharging ink from the nozzles 10 while moving the carriage 11 rightward or leftward along the head-moving direction, so as to form deviation detectable patterns, each of which has the ready-formed straight line and a printed straight line L2 intersecting each other. Even in this case, by reading the formed deviation detectable patterns, it is possible to acquire a positional deviation amount, relative to a reference position, of an ink droplet landing on each of the top portions Pt and the bottom portions Pb.

Further, the deviation detectable pattern is not limited to a pattern with two straight lines intersecting each other. The deviation detectable pattern may be another pattern configured to provide a printed result that varies depending on the positional deviation amount.

In the aforementioned embodiment, the ink discharging timing to discharge ink from the nozzles 10 is determined based on the positional deviation amounts on the top portions Pt and the bottom portions Pb. However, for instance, the ink discharging timing may be determined based on positional deviation values on portions of the mountain portions Pm other than the top portions Pt and portions of the valley portions Pv other than the bottom portions Pb.

In the aforementioned embodiment, by printing the deviation detectable patterns Q and reading the printed deviation detectable patterns Q, the positional deviation amounts on the top portions Pt and the bottom portions Pb are acquired as gap information related to a gap between the ink discharging surface 12a and each portion on the recording sheet P. However, different information related to the gap between the ink discharging surface 12a and each portion on the recording sheet P may be acquired. Further, the gap between the ink discharging surface 12a and each portion on the recording sheet P may be acquired by directly measuring the gap.

What is claimed is:

1. An inkjet printer, comprising:

an inkjet head configured to discharge ink droplets from nozzles formed in an ink discharging surface thereof;

a head scanning unit configured to move the inkjet head with respect to a recording medium to reciprocate along a head-moving direction, the head-moving direction being parallel with the ink discharging surface of the inkjet head;

a conveyer unit configured to convey the recording medium in a conveying direction which intersects with the head-moving direction, the conveyer unit including a feed roller and an ejection roller, which are arranged to have the inkjet head interposed therebetween along the conveying direction;

a position detecting unit configured to detect a position of the recording medium along the conveying direction;

a wave shape generating mechanism configured to deform the recording medium into a predetermined wave shape that has tops of portions protruding toward the ink discharging surface and bottoms of portions recessed toward a side opposite from the ink discharging surface, the tops and the bottoms being alternately arranged along the head-moving direction, the wave shape generating mechanism comprising a first wave shape generating unit, which is disposed on an upstream side with respect to the inkjet head along the conveying direction, and a second wave shape generating unit, which is disposed on a downstream side with respect to the inkjet head along the conveying direction;

a gap information storing device configured to store predetermined reference gap information related to a gap between the ink discharging surface and the recording medium at a predetermined reference position along the conveying direction, the predetermined reference gap information being acquired from a predetermined range in the recording medium; and a correcting device configured to correct the predetermined reference gap information stored in the gap information storing device according to a condition of the recording medium, which is determined depending on a position of the recording medium along the conveying direction detected by the position detecting unit, wherein the condition of the recording medium includes a first condition, in which the recording medium is deformed into the wave shape by the first wave shape generating unit, a second condition, in which the recording medium is deformed into the wave shape by the first wave shape generating unit and the second wave shape generating unit, and a third condition, in which the recording medium is deformed into the wave shape by the second wave shape generating unit, wherein the predetermined reference gap information corresponds to a gap between the ink discharging surface and the recording medium in one of the first, second, and third conditions, wherein the predetermined reference gap information is maintained without correction when the condition of the recording medium is determined to be the one of the first, second, and third conditions corresponding to the predetermined reference gap information, and wherein the predetermined reference gap information is corrected when the condition of the recording medium is determined to be one of the other two of the first, second, and third conditions than the one of the first, second, and third conditions corresponding to the predetermined reference gap information.

2. The inkjet printer according to claim 1, wherein the correcting device is configured to correct the predetermined reference gap information based on amplitude of the wave shape, the amplitude being variable depending on the position of the recording medium along the conveying direction.

3. The inkjet printer according to claim 2, wherein the correcting device is configured to correct the predetermined reference gap information based on a position of the recording medium along a direction orthogonal to the ink discharging surface, the position of the recording medium varying depending on the position of the recording medium along the conveying direction.

4. The inkjet printer according to claim 1, further comprising:

a discharging timing determining device configured to determine ink discharging timings to discharge ink from the nozzles of the inkjet head, while the inkjet head is moved along the head-moving direction, in accordance with the predetermined reference gap information corrected by the correcting device.

5. The inkjet printer according to claim 1, further comprising:

a pattern-printing control device configured to control the inkjet head and the head scanning unit to print a plurality of deviation detectable patterns along the head-moving direction on the recording medium, the deviation detectable patterns being used to detect amounts of positional deviation of ink landing positions along the head-moving direction for the ink discharged from the nozzles while the inkjet head is moved along the head-moving direction;

a pattern reading unit configured to read the plurality of deviation detectable patterns printed on the recording medium; and a positional deviation acquiring device configured to acquire the amounts of positional deviation of the ink landing positions within the predetermined range in the recording medium based on a result read by the pattern reading unit, wherein the gap information storing device stores the amounts of positional deviation of the ink landing positions to be the predetermined reference gap information, and wherein the correcting device corrects the amounts of positional deviation of the ink landing positions according to the position of the recording medium along the conveying direction detected by the position detecting unit.

6. The inkjet printer according to claim 1, wherein the predetermined reference gap information corresponds to the gap between the ink discharging surface and the recording medium in the second condition, and wherein the correcting device corrects the predetermined reference gap information corresponding to the gap between the ink discharging surface and the recording medium in the first and third conditions.

7. The inkjet printer according to claim 1, wherein, when the predetermined reference gap information corresponds to the gap between the ink discharging surface and the recording medium in the one of the first, second, and third conditions is represented by Y, the predetermined reference gap information corresponding to the gap between the ink discharging surface and the recording medium in the other two of the first, second, and third conditions is corrected according to a formula:

$$Y'=a\cdot Y+b,$$

wherein the value a is set depending on a ratio of amplitude in ripples in a wave shape of the recording medium in the one of the first, second, and third conditions with respect to amplitude in ripples in a wave shape of the recording medium in the other two of the first, second, and third conditions, and wherein the value b is set depending on a ratio of an amount of the gap between the ink discharging surface and the recording medium in the one of the first, second, and third conditions with respect to an amount of the gap between the ink discharging surface and the recording medium in the other two of the first, second, and the third conditions.

8. A method configured to be implemented on a control device connected with an inkjet printer, the inkjet printer comprising:

an inkjet head configured to discharge ink droplets from nozzles formed in an ink discharging surface thereof;

a head scanning unit configured to move the inkjet head with respect to a recording medium to reciprocate along a head-moving direction, the head-moving direction being parallel with the ink discharging surface of the inkjet head;

a conveyer unit configured to convey the recording medium in a conveying direction which intersects with the head-moving direction, the conveyer unit including a feed roller and an ejection roller, which are arranged to have the inkjet head interposed therebetween along the conveying direction;

a position detecting unit configured to detect a position of the recording medium along the conveying direction;

a wave shape generating mechanism configured to deform the recording medium into a predetermined wave shape that has tops of portions protruding toward the ink discharging surface and bottoms of portions recessed toward a side opposite from the ink discharging surface, the tops and the bottoms being alternately arranged along the head-moving direction, the wave shape generating mechanism comprising a first wave shape generating unit, which is disposed on an upstream side with respect to the inkjet head along the conveying direction, and a second wave shape generating unit, which is disposed on a downstream side with respect to the inkjet head along the conveying direction, the method comprising steps of:

acquiring predetermined reference gap information related to a gap between the ink discharging surface and the recording medium at a predetermined reference position from a predetermined range in the recording medium; and correcting the acquired predetermined reference gap information according to a condition of the recording medium, which is determined depending on a position of the recording medium along the conveying direction detected by the position detecting unit, wherein the condition of the recording medium includes a first condition, in which the recording medium is deformed into the wave shape by the first wave shape generating unit, a second condition, in which the recording medium is deformed into the wave shape by the first wave shape generating unit and the second wave shape generating unit, and a third condition, in which the recording medium is deformed into the wave shape by the second wave shape generating unit, wherein the predetermined reference gap information corresponds to a gap between the ink discharging surface and the recording medium in one of the first, second, and third conditions, wherein, in the step of correcting, the predetermined reference gap information is maintained without correction when the condition of the recording medium is determined to be the one of the first, second, and third conditions corresponding to the predetermined reference gap information, and wherein, in the step of correcting, the predetermined reference gap information is corrected when the condition of the recording medium is determined to be one of the other two of the first, second, and third conditions than the one of the first, second, and third conditions corresponding to the predetermined reference gap information.

9. The method according to claim 8, wherein the predetermined reference gap information corresponds to the gap between the ink discharging surface and the recording medium in the second condition, and wherein, in the step of correcting, the predetermined reference gap information corresponding to the gap between the ink discharging surface and the recording medium in the first and third conditions is corrected.

10. The method according to claim 8, wherein, when the predetermined reference gap information corresponding to the gap between the ink discharging surface and the recording medium in the one of the first, second, and third conditions is represented by Y, in the step of correcting, the predetermined reference gap information corresponding to the gap between the ink discharging surface and the recording medium in the other two of the first, second, and third conditions is corrected according to a formula:

$$Y'=a\cdot Y+b,$$

wherein the value a is set depending on a ratio of amplitude in ripples in a wave shape of the recording medium in the one of the first, second, and third conditions with respect to amplitude in ripples in a wave shape of the recording medium in the other two of the first, second, and third conditions, and wherein the value b is set depending on a ratio of an amount of the gap between the ink discharging surface and the recording medium in the one of the first, second, and third conditions with respect to an amount of the gap between the ink discharging surface and the recording medium in the other two of the first, second, and the third conditions.

11. An inkjet printer comprising:

an inkjet head configured to discharge ink droplets from nozzles formed in an ink discharging surface thereof;

a conveyer unit configured to convey a recording medium in a conveying direction, the conveyer unit including a feed roller and an ejection roller, which are arranged to have the inkjet head interposed therebetween along the conveying direction;

a position detecting unit configured to detect a position of the recording medium along the conveying direction;

a wave shape generating mechanism configured to deform the recording medium into a predetermined wave shape that has tops of portions protruding toward the ink discharging surface and bottoms of portions recessed toward a side opposite from the ink discharging surface, the tops and the bottoms being alternately arranged along an orthogonal direction being orthogonal to the conveying direction, the wave shape generating mechanism comprising a first wave shape generating unit, which is disposed on an upstream side with respect to the inkjet head along the conveying direction, and a second wave shape generating unit, which is disposed on a downstream side with respect to the inkjet head along the conveying direction; and a control device configured to:

store predetermined reference gap information related to a gap between the ink discharging surface and the recording medium at a predetermined reference position along the conveying direction, the predetermined reference gap information being acquired from a predetermined range in the recording medium; and correct the stored predetermined reference gap information according to a condition of the recording medium, which is determined depending on a position of the recording medium along the conveying direction detected by the position detecting unit, wherein the condition of the recording medium includes a first condition, in which the recording medium is deformed into the wave shape by the first wave shape generating unit, a second condition, in which the recording medium is deformed into the wave shape by the first wave shape generating unit and the second wave shape generating unit, and a third condition, in which the recording medium is deformed into the wave shape by the second wave shape generating unit, wherein the predetermined reference gap information corresponds to a gap between the ink discharging surface and the recording medium in one of the first, second, and third conditions, wherein the predetermined reference gap information is maintained without correction when the condition of the recording medium is determined to be the one of the first, second, and third conditions corresponding to the predetermined reference gap information, and wherein the predetermined reference gap information is corrected when the condition of the recording medium is determined to be one of the other two of the first, second, and third conditions than the one of the first, second, and third conditions corresponding to the predetermined reference gap information.

12. The inkjet printer according to claim 11 wherein the control device is further configured to correct the predetermined reference gap information based on variation of amplitude of the wave shape, which varies depending on the position of the recording medium along the conveying direction.

13. The inkjet printer according to claim 12, wherein the control device is further configured to correct the predetermined reference gap information based on a position of the recording medium along a direction orthogonal to the ink discharging surface, the position of the recording medium being variable depending on the position of the recording medium along the conveying direction.

14. The inkjet printer according to claim 11, wherein the control device is further configured to determine ink discharging timings to discharge ink from the nozzles of the inkjet head in accordance with the corrected predetermined reference gap information.

15. The inkjet printer according to claim 11, wherein the control device is further configured to:

control the inkjet head to print a plurality of deviation detectable patterns along the orthogonal direction on the recording medium, the deviation detectable patterns being used to detect amounts of positional deviation of ink landing positions along the orthogonal direction for the ink discharged from the nozzles;

read the plurality of deviation detectable patterns printed on the recording medium;

acquire the amounts of positional deviation of the ink landing positions within the predetermined range in the recording medium based on the read plurality of deviation detectable patterns, store the amounts of positional deviation of the ink landing positions to be the predetermined reference gap information; and correct the stored amounts of positional deviation of the ink landing positions according to the detected position of the recording medium along the conveying direction.

16. The inkjet printer according to claim 11, wherein the predetermined reference gap information corresponds to the gap between the ink discharging surface and the recording medium in the second condition, and wherein the predetermined reference gap information corresponding to the gap between the ink discharging surface and the recording medium in the first and third conditions is corrected.

17. The inkjet printer according to claim 11, wherein, when the predetermined reference gap information corresponds to the gap between the ink discharging surface and the recording medium in the one of the first, second, and third conditions is represented by Y, the predetermined reference gap information corresponding to the gap between the ink discharging surface and the recording medium in the other two of the first, second, and third conditions is corrected according to a formula:

$$Y'=a\cdot Y+b,$$

wherein the value a is set depending on a ratio of amplitude in ripples in a wave shape of the recording medium in the one of the first, second, and third conditions with respect to amplitude in ripples in a wave shape of the recording medium in the other two of the first, second, and third conditions, and wherein the value b is set depending on a ratio of an amount of the gap between the ink discharging surface and the recording medium in the one of the first, second, and third conditions with respect to an amount of the gap between the ink discharging surface and the recording medium in the other two of the first, second, and the third conditions.

*18. An inkjet printer comprising:*

*an inkjet head comprising an ink discharging surface;*

*a feed roller and an ejection roller configured to convey a recording medium in a conveying direction, the feed roller and the ejection roller being arranged to have the inkjet head interposed therebetween along the conveying direction;*

*a position detector configured to detect a position of the recording medium along the conveying direction;*

*a first wave shape generator disposed on an upstream side with respect to the inkjet head along the conveying direction and a second wave shape generator disposed on a downstream side with respect to the inkjet head along the conveying direction, the first wave shape generator and the second wave shape generator being configured to deform the recording medium into a wave shape that has a top portion protruding toward the ink discharging surface and a bottom portion recessed toward a side opposite from the ink discharging surface, the top portion and the bottom portion being arranged along an intersecting direction that intersects with the conveying direction and is parallel to the ink discharging surface;*

*a memory configured to store gap information related to a gap between the ink discharging surface and the recording medium at a predetermined reference position along the conveying direction, the gap information being acquired from a predetermined range in the recording medium; and*

*a controller being configured to:*

*determine a condition of the recording medium according to a position of the recording medium along the conveying direction, the condition of the recording medium including a first condition, in which the recording medium is deformed into the wave shape by the first wave shape generator, a second condition, in which the recording medium is deformed into the wave shape by the first wave shape generator and the second wave shape generator, and a third condition, in which the recording medium is deformed into the wave shape by the second wave shape generator, the gap information stored in the memory corresponding to a gap between the ink discharging surface and the recording medium being in one of the first, second and third conditions; and*

*correct the stored gap information based on the determined condition of the recording medium when the determined condition of the recording medium is one of the other two of the first, second and third conditions, the stored gap information being maintained without correction when the determined condition of the recording medium is the same as the one of the first, second and third conditions.*

*19. The inkjet printer according to claim 18,*

*wherein the first wave shape generator comprises a press part configured to press the recording medium from above, and the second wave generator comprises a spur wheel configured to press the recording medium from above.*

*20. The inkjet printer according to claim 19,*

*wherein the first wave shape generator further comprises a rib configured to support the recording medium from below to deform the recording sheet into the wave shape in conjunction with the press part, the press part and the rib being arranged along the intersecting direction.*

* * * * *